(12) United States Patent
Takahashi et al.

(10) Patent No.: US 9,543,792 B2
(45) Date of Patent: Jan. 10, 2017

(54) ROTARY ELECTRIC MACHINE, ELECTRIC MOTOR, MACHINE, ELECTRIC GENERATOR, AND ELECTRIC GENERATING MACHINE

(71) Applicant: KABUSHIKI KAISHA TOSHIBA, Tokyo (JP)

(72) Inventors: Hiroshi Takahashi, Kanagawa (JP); Yasuhito Ueda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 58 days.

(21) Appl. No.: 14/483,698

(22) Filed: Sep. 11, 2014

(65) Prior Publication Data

US 2015/0084465 A1 Mar. 26, 2015

(30) Foreign Application Priority Data

Sep. 20, 2013 (JP) ................. 2013-195931

(51) Int. Cl.
*H02K 21/12* (2006.01)
*H02K 1/14* (2006.01)
*H02K 21/14* (2006.01)

(52) U.S. Cl.
CPC ............ *H02K 1/145* (2013.01); *H02K 21/145* (2013.01); *H02K 1/141* (2013.01)

(58) Field of Classification Search
CPC ................................. H02K 1/141; H02K 1/145
(Continued)

(56) References Cited

U.S. PATENT DOCUMENTS 6,229,238 B1 5/2001 Graef 6,888,272 B2 5/2005 Kastinger
(Continued)

FOREIGN PATENT DOCUMENTS

CN 2264438 Y 10/1997
CN 101662192 A 3/2010
(Continued)

OTHER PUBLICATIONS

First Notification of Amendment issued by the State Intellectual Property Office of the People's Republic of China on Nov. 26, 2014, for Chinese Patent Application No. 201420510108.0, and English-language translation thereof.
(Continued)

*Primary Examiner* — Hanh Nguyen
(74) *Attorney, Agent, or Firm* — Finnegan, Henderson, Farabow, Garrett & Dunner LLP

(57) ABSTRACT

According to one embodiment, a rotary electric machine includes a rotor that is rotatable at a predetermined position and includes a plurality of first magnetic members arranged along an outer circumferential surface, the first magnetic members each including a first magnetic pole and a second magnetic pole. The rotary electric machine includes a first supporting member that surrounds a periphery of the rotor. The rotary electric machine includes a plurality of second supporting members that are fixed to an inner circumferential surface of the first supporting member. The rotary electric machine includes a plurality of second magnetic members that are fixed on side surfaces of the second supporting members and that have a third magnetic pole facing the first magnetic pole with an air gap and a fourth magnetic pole facing the second magnetic pole with an air gap.

12 Claims, 18 Drawing Sheets

(58) Field of Classification Search
USPC .............. 310/216.075, 156.01, 156.02
See application file for complete search history.

(56) References Cited

U.S. PATENT DOCUMENTS

| | | | |
|---|---|---|---|
| 7,355,312 B2 | 4/2008 | Kataoka et al. | |
| 2002/0074891 A1 | 6/2002 | Gieras et al. | |
| 2002/0113520 A1 | 8/2002 | Kastinger et al. | |
| 2006/0197399 A1 | 9/2006 | Kataoka et al. | |
| 2008/0246362 A1* | 10/2008 | Hirzel | H02K 21/12 310/156.02 |
| 2010/0052467 A1* | 3/2010 | Gieras | H02K 1/145 310/216.016 |
| 2010/0289373 A1 | 11/2010 | Nishiyama | |
| 2012/0249035 A1 | 10/2012 | Ueda | |
| 2013/0038158 A1 | 2/2013 | Takahashi | |
| 2014/0117793 A1 | 5/2014 | Takahashi | |
| 2015/0084465 A1 | 3/2015 | Takahashi et al. | |

FOREIGN PATENT DOCUMENTS

| | | |
|---|---|---|
| CN | 202586688 U | 12/2012 |
| CN | 204669111 U | 9/2015 |
| JP | 2003-533162 | 11/2003 |
| JP | 3485887 | 1/2004 |
| JP | 2006-174692 | 6/2006 |
| JP | 2006-191789 | 7/2006 |
| JP | 4085059 | 2/2008 |
| JP | 2012-217312 | 11/2012 |
| JP | 2013-38944 | 2/2013 |
| JP | 2014-60876 | 4/2014 |
| WO | WO 03/019756 | 3/2003 |
| WO | WO 2010/050172 | 5/2010 |

OTHER PUBLICATIONS

First Office Action mailed on Jun. 27, 2016, in corresponding Chinese patent Application No. 201410450160.6.

* cited by examiner

ROTARY ELECTRIC MACHINE, ELECTRIC MOTOR, MACHINE, ELECTRIC GENERATOR, AND ELECTRIC GENERATING MACHINE

CROSS-REFERENCE TO RELATED APPLICATIONS

This application is based upon and claims the benefit of priority from Japanese Patent Application No. 2013-195931 filed Sep. 20, 2013; the entire contents of which are incorporated herein by reference.

FIELD

Embodiments described herein relate generally to a rotary electric machine, an electric motor, a machine, an electric generator, and an electric generating machine

BACKGROUND

For the purpose of energy conservation, reduction of carbon dioxide ($CO_2$) and the like, electromagnetic motors are required to have further enhanced performances, and these performances represented by reduced size and weight, higher efficiency, higher torque, and higher power have been dramatically enhanced on a daily basis. Electromagnetic motors can be broadly classified into (1) radial flux motors, (2) axial flux motors, and (3) transverse flux motors, based on magnetic flux direction.

Among these types, radial flux motors are excellent especially in cost performance, and have been widely used for various products in the industrial community as representative machine elements of general-purpose actuators. In addition, axial flux motors are structurally characterized in that they can be adapted to complex three-dimensional magnetic circuit configurations whereas it is difficult to use laminated steel plates, which have been commonly used, in such applications. Axial flux motors are applied, in particular, in the fields of medium/large-sized large-diameter thin motors.

Furthermore, transverse flux motors each include an armature (configuring a divided toroidal core), as a basic unit, constituted by a rotor including permanent magnets, a circular coil formed about a rotation axis of this rotor, and a plurality of stator cores each having a substantial U shape (hereinafter, referred to as U-shaped stator cores) that are provided on a circumference about the rotation axis so as to surround the circular coil. Transverse flux motors are characterized by their configuration in which two or more of the basic units are muitistaged along the rotation axis at a predetermined relative phase angle about the rotation axis, which can relatively simply achieve a higher torque due to the multipolarization and high-efficiency magnetic field generation due to the divided toroidal core structure.

Radial flux motors and axial flux motors each need a stator core including a plurality of slots on a circumference about a rotation axis, coils wound around the these slot portions, and a dead space for assembling and inserting the coils and the like. In contrast, transverse flux motors are generally easy to multipolarize because the multipolarization can be made only by providing a plurality of U-shaped stator cores on the circumference about the rotation axis.

In addition, since an armature constituted by the circular coils and the U-shaped stator cores (divided toroidal cores) has a structure in which magnetic flux generated from the coil hardly leaks outside, magnetic field generation efficiency by the coils is high, and downsizing thereof can be expected as compared with radial flux motors and axial flux motors including coil ends.

DETAILED DESCRIPTION

According to one embodiment, a rotary electric machine includes a rotor that is rotatable at a predetermined position and includes a plurality of first magnetic members arranged along an outer circumferential surface, the first magnetic members each including a first magnetic pole and a second magnetic pole that is different from the first magnetic pole and is positioned away from the first magnetic pole in a longitudinal direction on the outer circumferential surface. The rotary electric machine includes a first supporting member that surrounds a periphery of the rotor. The rotary electric machine includes a plurality of second supporting members that are fixed to an inner circumferential surface of the first supporting member. The rotary electric machine includes a plurality of second magnetic members that are fixed on side surfaces of the second supporting members and that have a third magnetic pole facing the first magnetic pole with an air gap and a fourth magnetic pole being a magnetic pole different from the third magnetic pole and facing the second magnetic pole with an air gap at a position away from the third magnetic pole in the longitudinal direction of the rotor.

Embodiments of the present invention will be described below with reference to the drawings.

First Embodiment

A rotary electric machine 1 in a first embodiment of the present invention will be described below with reference to the drawings FIG. 1 to FIG. 4.

Figure 1A:
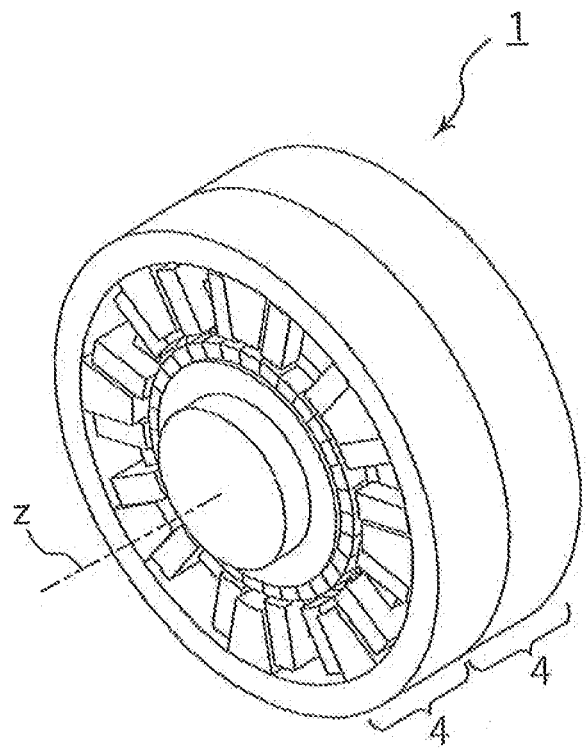
FIG. 1A is a perspective view showing a configuration of the rotary electric machine 1 in the first embodiment.

FIG. 1A is a perspective view showing a configuration of the rotary electric machine 1 in the first embodiment. The rotary electric machine 1 is a two-stage rotary electric machine in which two basic units 4 are arranged along a rotation axis in a z direction thereof.

Figure 1B:
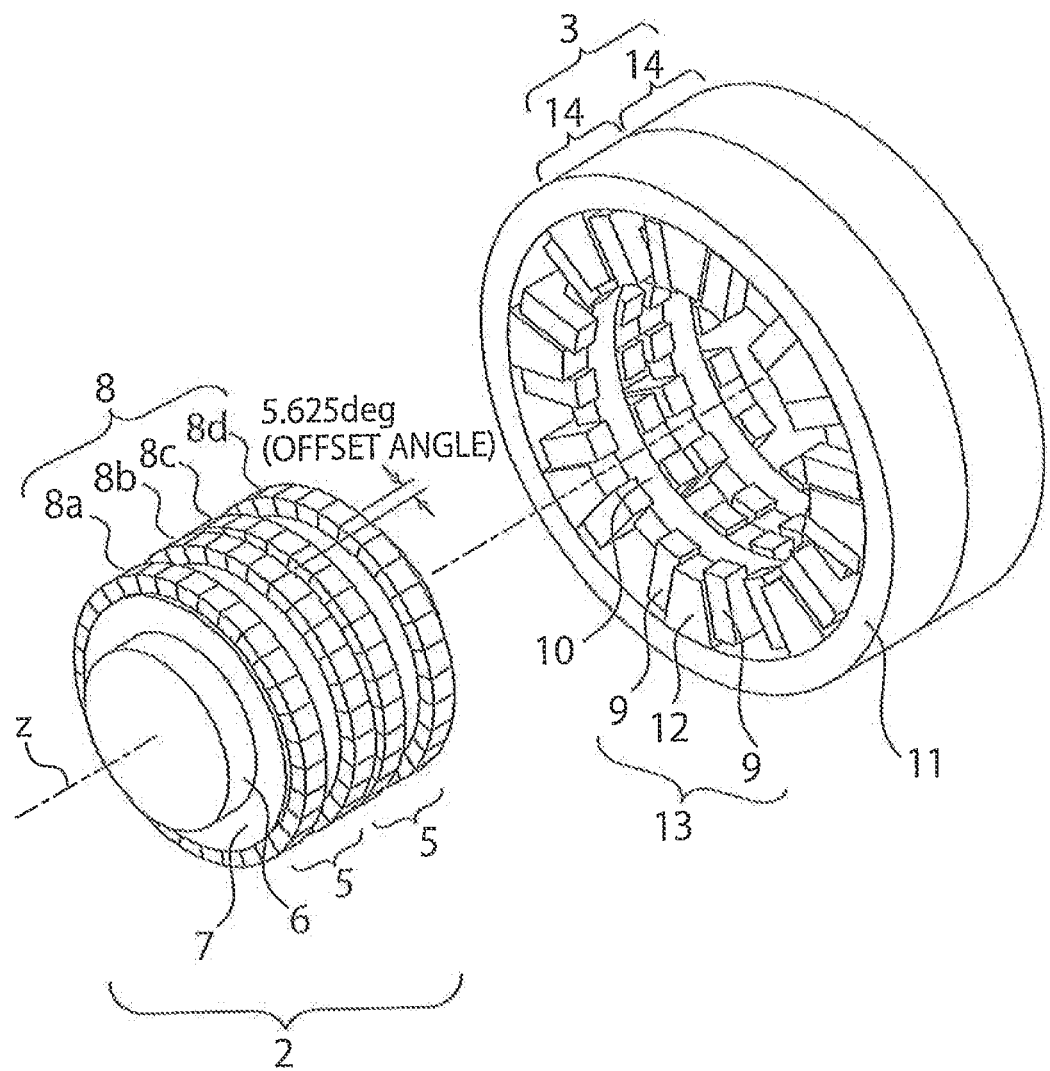
FIG. 1B is a an exploded perspective view of a rotor 2 and a stator 3 that are disassembled from the rotary electric machine 1 and arranged along the z direction of the rotation axis of the rotary electric machine 1.

FIG. 1B is a an exploded perspective view of a rotor 2 and a stator 3 that are disassembled from the rotary electric machine 1 and arranged along the z direction of the rotation axis of the rotary electric machine 1. As shown in FIG. 1B, the rotary electric machine 1 is constituted by the rotor 2 that is rotatably supported by bearings (not shown) along the rotation axis z, and the stator 3 that is provided so as to surround the entire rotor 2.

In the rotor 2, the two basic units 4 include rotators 5 that are arranged along the z direction of the rotation axis, and are fixed to a shaft 6 with a relative phase angle of 5.625 degrees (an offset angle of the 32-pole two-stage rotary electric machine) in a rotational direction. The rotor 2 is rotatable about a center of the rotor 2 (here, the rotation axis z) at a predetermined position, has a cylindrical shape, and includes, on an outer circumferential surface thereof, a first magnetic pole and a second magnetic pole that is different from this first magnetic pole and is positioned away from the first magnetic pole in a longitudinal direction (i.e., in the z direction of the rotation axis) of the rotor 2, based on the magnetomotive force.

The rotators 5 are constituted by circular rotator cores 7, and permanent magnets 8a, 8b, 8c, and 8d being two pairs of first magnetic members that are provided so as to be separated from each other in the rotation axis z on outer circumferential surfaces of the rotator cores 7. Here, the permanent magnet 8a pairs off with the permanent magnet 8b make one pair, and the permanent magnet 8c pairs off with the permanent magnet 8d make another pair. The permanent magnets 8a, 8b, 8c, and 8d are called a permanent magnet 8 as a whole.

The permanent magnet 8 has north poles and south poles that are magnetized substantially in a radial direction of the rotor 2, and includes 32 magnetic poles that are the north poles and the south poles alternately arranged on the outer circumferential surface of the rotor 2 in the rotational direction.

Furthermore, the one permanent magnet 8a and the other permanent magnet 8b are fixed on the rotator core 7 with the relative phase angle corresponding to a magnetic pole pitch in the rotational direction. For example, when a magnetic pole of the permanent magnet 8a at a phase angle in the rotational direction is the north pole on the outer circumferential surface of the rotor 2, a magnetic pole of the permanent magnet 8b at the same phase angle in the rotational direction is the south pole on the outer circumferential surface of the rotor 2 (refer to FIG. 3A and FIG. 3B).

Note that, in the present embodiment, the permanent magnet 8 arranged along the outer circumferential surface of the cylinder of the rotor 2 is used, but the present invention is not limited thereto, and another plurality of first magnetic members made of a magnetic substance arranged along the outer circumferential surface of the abovementioned cylinder may be used. This magnetic substance is preferably a ferromagnetic substance. In addition, the permanent magnet 8 is also included in this first magnetic member. Hereinafter, each embodiment will be described assuming that the permanent magnets are an example the first magnetic members made of the magnetic substance and arranged along the outer circumferential surface of the rotor having the cylindrical shape.

In the stator 3, armatures 14 included in two basic units 4 arranged along in the z direction of the rotation axis are coupled and fixed to each other with a relative angle of zero (in phase in the rotational direction).

The armature 14 includes a number N=16 of stator cores 9 that are arranged facing the permanent magnet 8 of the rotator 5 with a predetermined air gap, and a circular armature coil 10 that is formed into a substantial concentric shape with the rotor 2 about the rotation axis z.

Furthermore, the armature 14 includes a casing 11 that incorporates therein the stator cores 9 and the armature coil 10 and forms a circular first supporting member surrounding the rotor 2 about the rotation axis z, and core supporting blocks 12 that are brought into contact and fixed to an inner circumferential surface of the casing 11 and form second supporting members fixing and supporting the stator cores 9 in the rotational direction at predetermined positions.

Note that, in the present embodiment, there is described that the stator 3 includes the stator cores 9, but the present invention is not limited thereto, the stator 3 may include the plurality of second magnetic members made of a magnetic substance, which face the first magnetic member with a predetermined air gap. This magnetic substance is preferably a ferromagnetic substance. In addition, the stator cores 9 are also included in the second magnetic member. Hereinafter, each embodiment will be described assuming that the stator cores are an example of the second magnetic members that are included in the stator 3, face the first magnetic member with the predetermined air gap, and made of the magnetic substance.

Figure 2A:
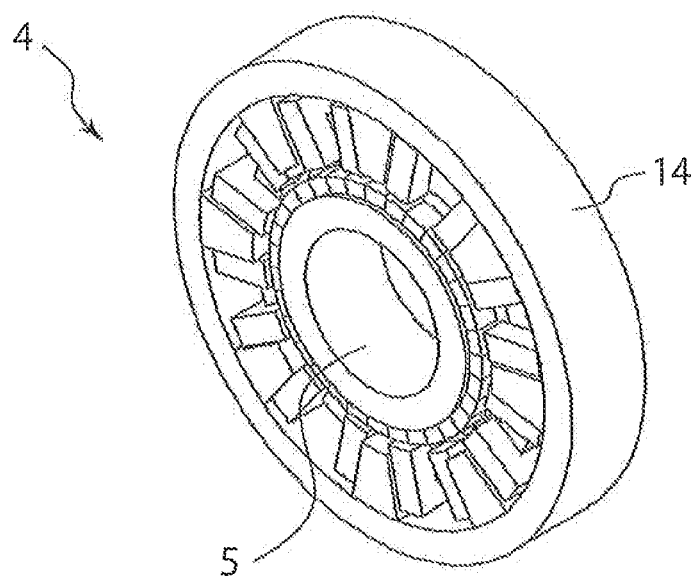
FIG. 2A is a perspective view of the basic unit 4 in the rotary electric machine 1.
Figure 2B:
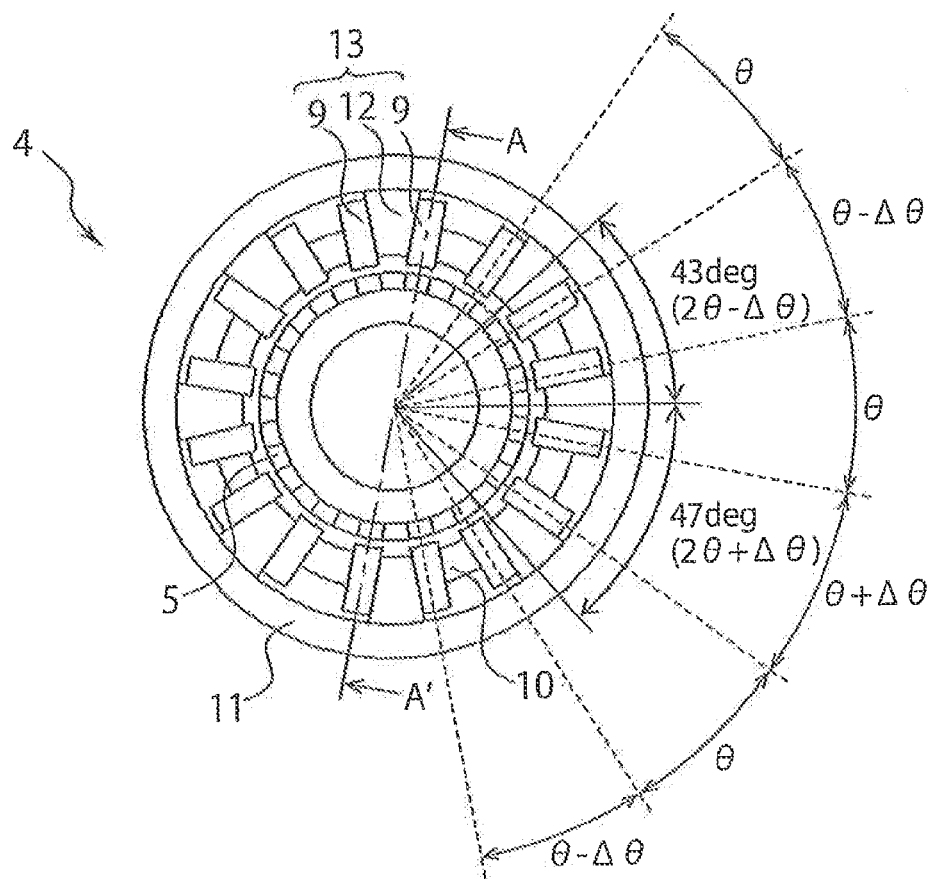
FIG. 2B is a plan view of the basic unit 4 in the z direction of the rotation axis.

FIG. 2 is a configuration diagram showing the basic unit 4 in the rotary electric machine 1 further in detail. FIG. 2A is a perspective view of the basic unit 4 in the rotary electric machine 1. FIG. 2B is a plan view of the basic unit 4 in the z direction of the rotation axis.

As shown in FIG. 2B, a number "N" of the stator cores 9 being the second magnetic members is a multiple of 4, the stator cores 9 being the second magnetic members are fixed to both side surfaces of the second supporting member one by one, and a equally distributed reference angle "θ" is defined as an angle (=360/N [deg]) obtained by dividing 360 degrees by the number "N" of the second magnetic members. Then, as shown in FIG. 2B, the core supporting blocks 12 being the second supporting members are disposed such that differences between rotational angles, about the rotation axis, of the second supporting members 12 that are adjacent to each other along the circumferential direction of the rotor 2 alternately repeat an angle of 2θ+Δθ obtained by adding an adjustment angle "Δθ" to twice the equally distributed reference angle "θ" (here, 47 deg as an example) and an angle 2θ−Δθ obtained by subtracting the adjustment angle "Δθ" from twice the equally distributed reference angle (here, 43 deg as an example), along the circumferential direction of the abovementioned rotor 2.

From a viewpoint of the arrangement of the stator cores 9 being the second magnetic members, as shown in FIG. 2B, the stator cores 9 being the second magnetic members are arranged such that differences between the rotational angles, about the rotation axis, of the stator cores 9 being the second magnetic members that are adjacent to each other along the circumferential direction of the rotor 2 repeat an angle θ−Δθ obtained by subtracting the adjustment angle "Δθ" from the equally distributed reference angle "θ", the equally distributed reference angle "∝", an angle θ+Δθ obtained by adding the above adjustment angle "Δθ" to the equally distributed reference angle "θ", and the equally distributed reference angle "θ", in this order along the circumferential direction of the rotor 2.

Figure 2C:
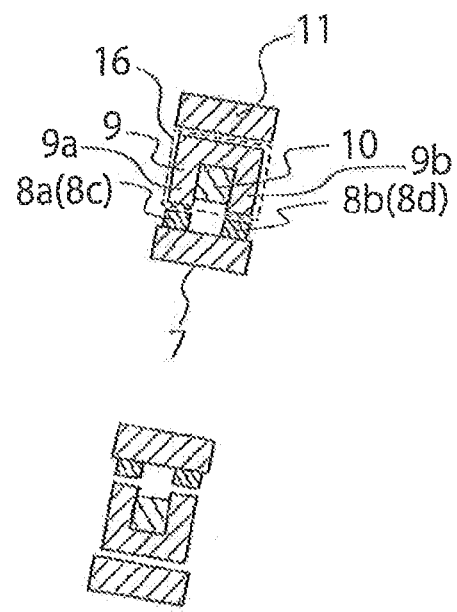
FIG. 2C is a partial cross sectional view showing part of a cross section taken along a line A-A° in the plan view of FIG. 2B.

FIG. 2C is a partial cross sectional view showing part of a cross section taken along a line A-A' in the plan view of FIG. 2B.

As shown in FIG. 2C, the rotary electric machine 1 includes a second magnetic body units 16 each of which is fixed on the side surfaces of the second supporting member, and generates a third magnetic pole facing the first magnetic pole with a predetermined air gap and a fourth magnetic pole that is different from this third magnetic pole and positioned away from this third magnetic pole in the longitudinal direction of the rotor 2 (i.e., in the z direction of the rotation axis). Here, this second magnetic body unit 16 includes the armature coil 10 surrounding the rotor 2 about the rotation axis z, and the stator core 9 that is fixed on the side surface of the core supporting block 12 being the second supporting member. Current flowing through the armature coil 10 generates a magnetic circuit therein, and the stator core 9 thereby generates the abovementioned third magnetic pole and the abovementioned fourth magnetic pole.

As shown in FIG. 2C, the stator core 9 includes the magnetic pole portions 9a and 9b arranged facing the permanent magnet 8a (8c) and the permanent magnet 8b (8d) with predetermined air gaps, and forms a U shape as a whole. Then, the armature coil 10 is fixed by supporting means (not shown) at a position including an area surrounded by a line facing the permanent magnet 8a (8c) and the permanent magnet 8b (8d) and connecting the magnetic pole portions 9a and 9b, and by the U shape of the stator core 9.

Note that there is described that the second magnetic body unit includes the stator core 9, but the present invention is not limited thereto, and the second magnetic body unit may include a magnetic member containing another magnetic substance.

In addition, the equally distributed reference angle θ=22.5 deg (360 deg/N) about the rotation axis is defined. The stator core unit 13 includes the two stator core 9 and the core supporting block 12 arranged such that arrangement pitch angle between these two stator cores 9 is equal to the equally distributed reference angle "θ".

The plurality of core supporting blocks 12 forming the second supporting members are fixed on the inner circumferential surface of the casing 11 being the first supporting member, and each has side surfaces formed along radial directions of this circular shape of casing 11.

Figure 3A:
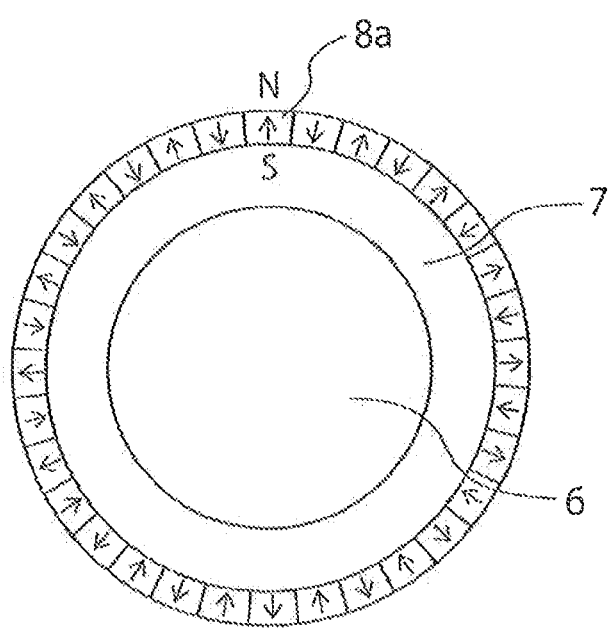
FIG. 3A is a cross sectional view of the permanent magnet 8a viewed in the z direction of the rotation axis.
Figure 3B:
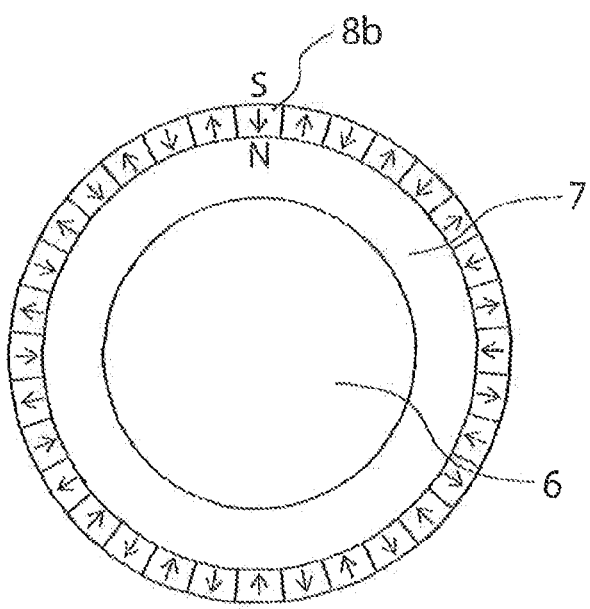
FIG. 3B is a cross sectional view of the permanent magnet 8b viewed in the z direction of the rotation axis.

FIG. 3A is a cross sectional view of the permanent magnet 8a viewed in the z direction of the rotation axis. FIG. 3B is a cross sectional view of the permanent magnet 8b viewed in the z direction of the rotation axis. Arrows shown in FIG. 3A and FIG. 3B represent the north poles and the south poles of the permanent magnet 8a or the permanent magnet 8b. As can be seen, a magnetic pole of the permanent magnet 8a on the outer circumferential surface of the rotor 2 at any phase angle in the rotational direction is different from a magnetic pole of the permanent magnet 8b on the outer circumferential surface of the rotor 2 at the same phase angle in the rotational direction. Here, the magnetic poles are either the north pole or the south pole.

Figure 4A:
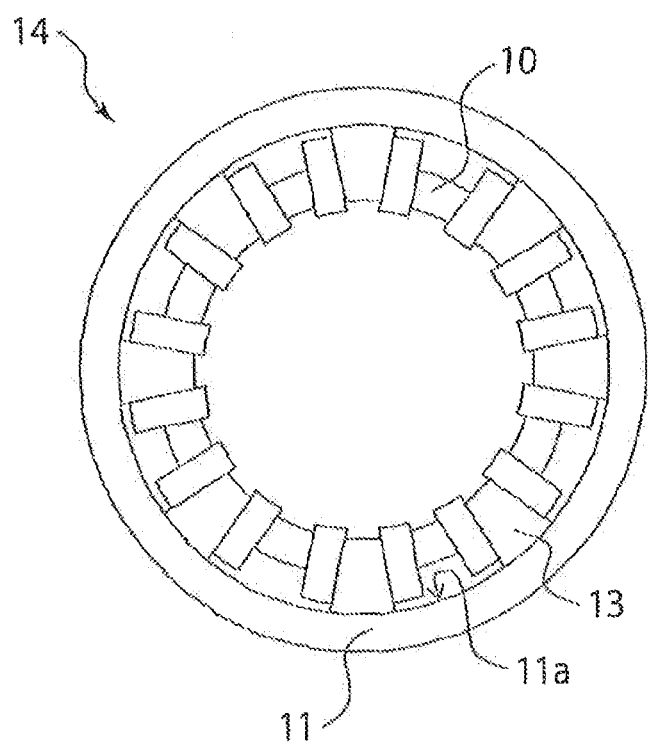
FIG. 4A is a plan view of the armature 14 viewed in the z direction of the rotation axis.
Figure 4B:
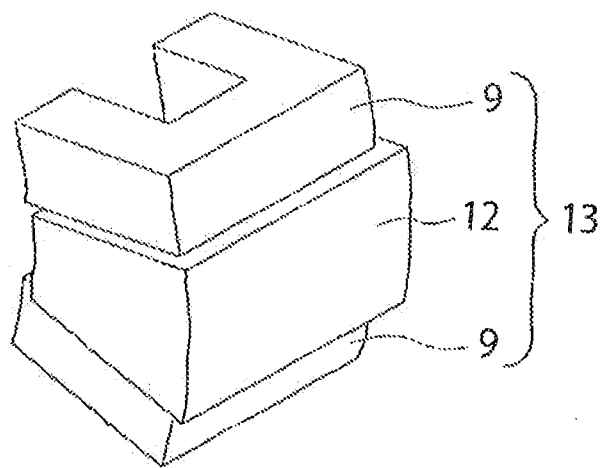
FIG. 4B is a perspective view of the stator core unit 13.
Figure 4C:
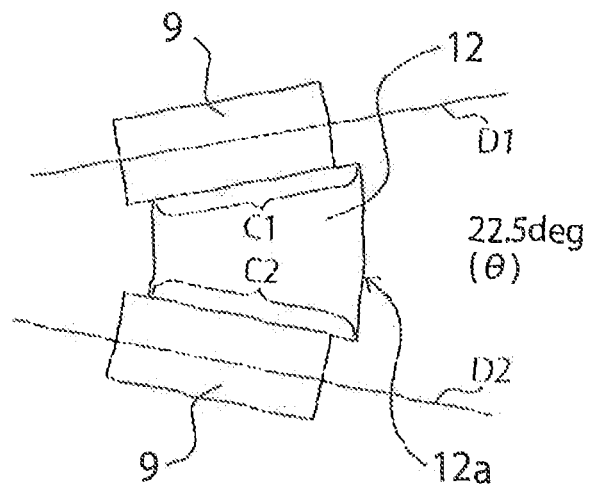
FIG. 4C is a plan view of the stator core unit 13 viewed in the z direction of the rotation axis.

FIG. 4 is a configuration diagram of the armature 14 in the basic unit 4 further in detail. FIG. 4A is a plan view of the armature 14 viewed in the z direction of the rotation axis. FIG. 4B is a perspective view of the stator core unit 13. FIG. 4C is a plan view of the stator core unit 13 viewed in the z direction of the rotation axis.

As shown in FIG. 4C, when two planes B (reference planes) are provided, which form the arrangement pitch angle of the stator cores 9 equal to the equally distributed reference angle "θ" and pass through the rotation axis z, the core supporting block 12 is provided such that these planes B are identical to neutral planes D1 and D2 of the stator cores 9 (planes each dividing the stator core 9 into equal parts widthwise), respectively, and the core supporting block 12 has planes (mounting plane) C1 and C2 parallel to the planes B, respectively. The stator cores 9 are brought into contact and fixed to the respective planes C1 and C2.

Furthermore, when the adjustment angle "Δθ" is defined, the stator core units 13 are fixed to the casing 11 along the rotational direction forming nonuniform angles of 2θ+Δθ, "θ", and 2θ−Δθ, in this order. More specifically, if the adjustment angle Δθ=2 deg, 2θ+Δθ and 2θ−Δθ are 47 deg and 43 deg, respectively. An outer circumferential surface 12a of the core supporting block 12 formed concentrically about the rotation axis z is brought into contact and fixed to an inner circumferential surface 11a of the casing 11.

Note that in the abovementioned embodiment, there is described the case where the adjustment angle Δθ=2 deg, but "Δθ" is not limited thereto, and may be within a range 0≤Δθ<θ/4. Here, if the adjustment angle Δθ=0 deg, all the stator cores 9 are arranged forming even angles along the rotational direction. A specific value of the adjustment angle "Δθ" can be determined as an optimal number as appropriate according to a required specification of the design of the rotary electric machine. The same applies to the following.

In such a manner, in the 32-pole two-stage rotary electric machine, according to the configuration which uses the stator core unit 13 including stator cores 9 arranged forming the arrangement pitch angles that is equal to the equally distributed reference angle θ=22.5 deg, and in which the stator core units 13 are fixed to the casing 11 along the rotational direction forming the nonuniform angles of 2θ+Δθ and 2θ−Δθ, in this order (note that these angles are the even angles if Δθ=0 deg), it is possible to disperse the rotational angles of the rotor 2 at which magnetic force that intermittently changes with respect to the magnetic pole portions of the stator core in the rotational direction with rotational driving reaches a peak. Thus, togging torque causing uneven torque can be reduced as compared with the rotary electric machine including the stator cores 9 arranged forming the even angles (i.e., the adjustment angle Δθ=0). Rotation characteristic of suppressed uneven rotation can be thereby expected, and generation of vibration and noise can be further reduced by reducing the uneven torque. For this reason, the adjustment angle "Δθ" is preferably greater than zero degree and less than a quarter of the equally distributed reference angle "θ" (Leg, 0<Δθ<θ4). The cogging torque causing the uneven torque can be thereby reduced as compared with the rotary electric machine including the stator cores 9 arranged forming the even angles (i.e., the adjustment angle "Δθ"=0).

At this point, since all the stator core units 13 have the same shape, a manufacturing process can be simplified as compared with a manufacturing method in which the stator cores 9 are independently assembled in conformity with the nonuniform angles, and economies of mass production such as reduction of manufacturing cost can be expected at a higher level.

As described above, the rotary electric machine 1 in the first embodiment includes the rotor 2 that is rotatable at the predetermined position and that includes the plurality of permanent magnets being the first magnetic members are arranged along the outer circumferential surface, which have the first magnetic pole and the second magnetic pole that is different from the first magnetic pole and positioned away from the first magnetic pole in the longitudinal direction on the outer circumferential surface. The rotary electric machine 1 further includes the first supporting member surrounding the periphery of the rotor 2, and the plurality of the second supporting members that are fixed on the inner circumferential surface of the first supporting member. The rotary electric machine 1 further includes the plurality of second magnetic members that are fixed to the side surfaces of the second supporting member, and each have the third magnetic pole facing the first magnetic pole with the air gap and the fourth magnetic pole that is a magnetic pole different from this third magnetic pole and faces the second magnetic pole with the air gap and positioned away from the third magnetic pole in the longitudinal direction of the rotor 2.

With this configuration, since the vicinity of the magnetic pole portions of the second magnetic member can be supported and fixed with high stiffness even in the case of generation of the magnetic force that intermittently changes with respect to the magnetic pole portions of the second magnetic member in the rotational direction with rotational driving, support stiffness for the second magnetic member can be enhanced, and it can be expected that occurrence of the vibration and noise is prevented.

In addition, according to the rotary electric machine 1 in the first embodiment, the number of the second magnetic members is a multiple of 4, the above second magnetic members are fixed to both side surfaces of the second supporting member one by one, and the equally distributed reference angle is defined as an angle obtained by dividing 360 degrees by the number "N" of the second magnetic members. In this case, as shown in FIG. 2B, the second supporting members 12 are disposed such that differences between the rotational angles, about the rotation axis, of the second supporting members that are adjacent to each other along the circumferential direction of the rotor 2 alternately repeat the angle obtained by adding the adjustment angle "Δθ" to twice the equally distributed reference angle "θ" and the angle obtained by subtracting the adjustment angle "Δθ" from twice the equally distributed reference angle, along the circumferential direction of the rotor 2.

In addition, when this configuration is viewed from a viewpoint of the arrangement of the stator cores 9 being the second magnetic members, as shown in FIG. 2B, the stator cores 9 being the second magnetic members are arranged such that differences between the rotational angles, about the rotation axis, of the stator cores 9 that are adjacent to each other along the circumferential direction of the rotor 2 repeat the angle obtained by subtracting the adjustment angle "Δθ" from the equally distributed reference angle "θ", the equally distributed reference angle "θ", the angle obtained by adding the abovementioned adjustment angle "Δθ" to the equally distributed reference angle "θ", and the equally distributed reference angle "θ", in this order along the circumferential direction of the rotor 2.

This configuration is constituted by the number "N" of the stator cores, and by the arrangement of the second supporting member on the first supporting member along the circumferential direction at nonuniform angles of 2θ+Δθ and 2θ−Δθ, in this order. For this reason, it is possible to disperse the rotational angle of the rotor 2 at which magnetic force that intermittently changes with respect to the magnetic pole portions of the stator core in the rotational direction with rotational driving reaches a peak, and the cogging torque causing the uneven torque can be reduced. The occurrence of vibration and noise can be thereby further reduced.

Second Embodiment

A second embodiment will be next described.

Figure 5A:
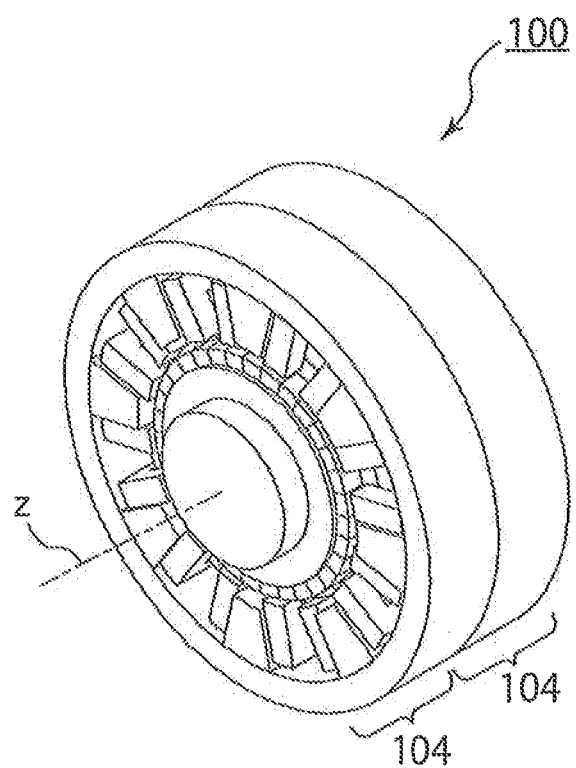
FIG. 5A is a perspective view showing a configuration of a rotary electric machine 100 in the second embodiment.
Figure 5B:
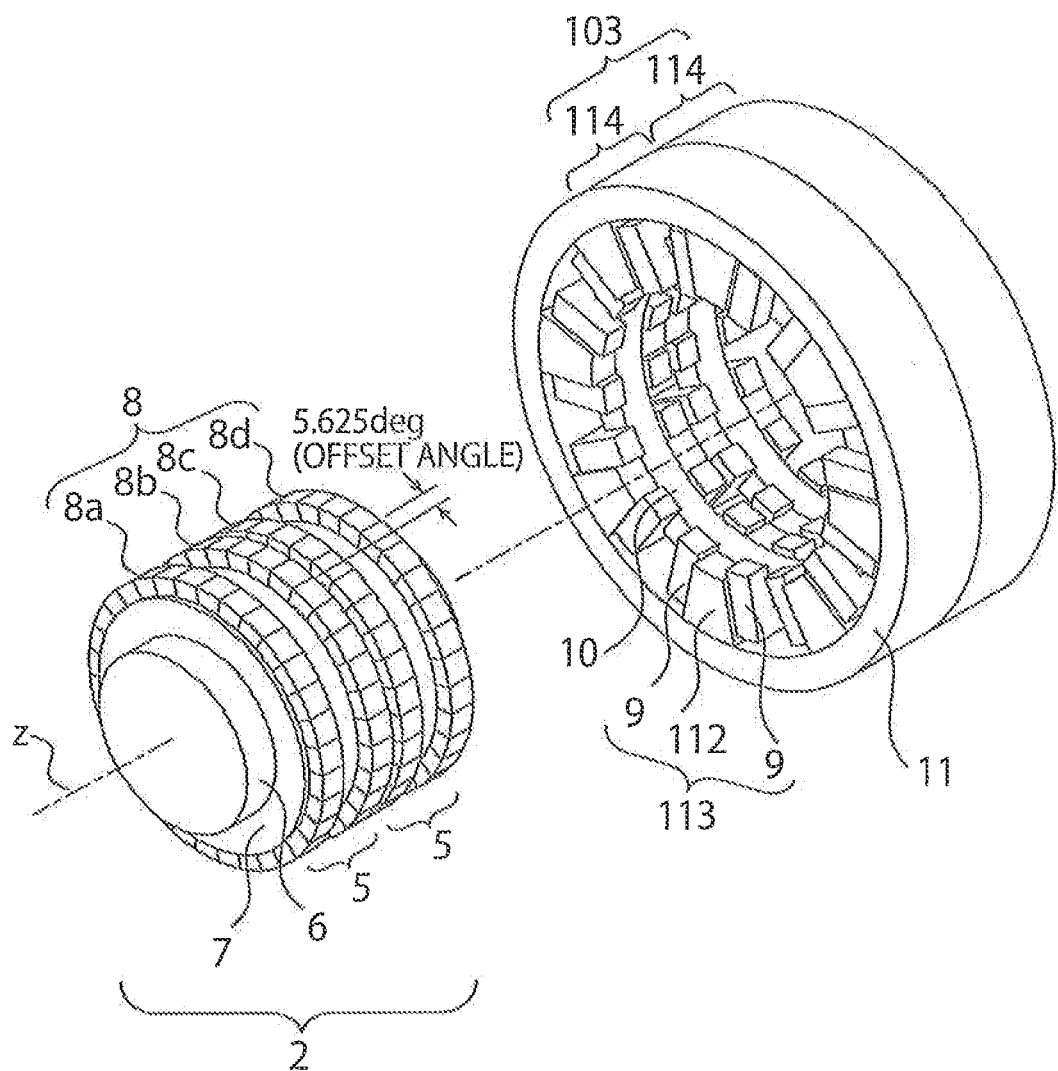
FIG. 5B is an exploded perspective view of the rotor 2 and a stator 103 that are disassembled from the rotary electric machine 100 and arranged along a rotation axis in the z direction of the rotary electric machine 100 in the second embodiment.

FIG. 5A is a perspective view showing a configuration of a rotary electric machine 100 in the second embodiment. FIG. 5B is an exploded perspective view of the rotor 2 and a stator 103 that are disassembled from the rotary electric machine 100 and arranged along a rotation axis in the z direction of the rotary electric machine 100 in the second embodiment. The rotary electric machine 100 has components common to those of the rotary electric machine 1 in the first embodiment shown in FIG. 1 to FIG. 4, and detailed contents that have already been described will be omitted, and the different components will be described. The same applies to FIG. 6 and the following drawings.

The rotary electric machine 100 is constituted by the rotor 2 that is rotatably supported by the bearings (not shown) along the rotation axis z, and a stator 103 that is provided so as to surround the entire rotor 2, and is a two-stage rotary electric machine in which two basic units 104 are arranged along in the z direction of the rotation axis.

In the stator 103, armatures 114 included in the two basic units 104 that are arranged along in the z direction of the rotation axis are coupled and fixed to each other with a relative angle of zero (in phase in the rotational direction).

The armature 114 includes the number N=16 of the stator cores 9 that are arranged facing the permanent magnet 8 of the rotator 5 with a predetermined air gap, the circular armature coil 10 that is formed into a substantial concentric shape with the rotor 2 about the rotation axis z, the casing 11, and core supporting blocks 112 that are brought into contact and fixed to the inner circumferential surface of the casing 11 and form the second supporting members fixing and supporting the stator cores 9 in the rotational direction at predetermined positions.

Figure 6A:
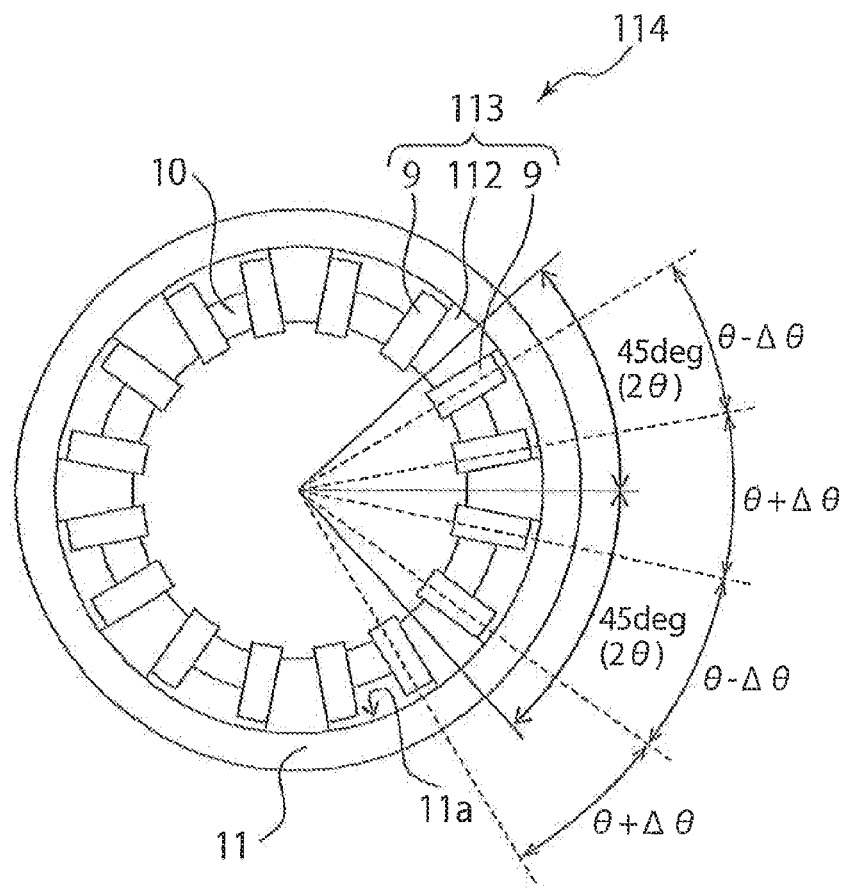
FIG. 6A is a plan view of the armature 114 viewed in the z direction of the rotation axis.

FIG. 6A is a plan view of the armature 114 viewed in the z direction of the rotation axis.

As shown in FIG. 6A, the stator core unit 113 is constituted by the core supporting block 112 and the two stator cores 9 that are fixed to both side surfaces of this core supporting block 112.

In addition, the equally distributed reference angle $\theta=22.5$ ($=360/N$) [deg] about the rotation axis and the predetermined adjustment angle "$\Delta\theta$" are defined. Here, "$\Delta\theta$" is two degrees as an example. The arrangement pitch angle of the two stator cores 9 that are fixed to both side surfaces of the core supporting block 112 is configured so as to be equal to $\theta+\Delta\theta$, as an example. Here, the arrangement pitch angle is a difference between the rotational angles of the stator cores 9 that are adjacent to each other along the circumferential direction of the rotor 2 about a center of the rotor 2.

In addition, the arrangement pitch angle of the two stator cores 9 that are adjacent to each other about the rotation axis and are fixed to the different core supporting blocks 112 is configured so as to be equal to $\theta-\Delta\theta$, as an example.

In such a manner, the second magnetic members are arranged such that differences between the rotational angles, about the center of the rotor 2, of the stator cores 9 being the second magnetic members that are adjacent to each other along the circumferential direction of the rotor 2 repeat an angle $\theta-\Delta\theta$ obtained by subtracting the adjustment angle from the equally distributed reference angle, and an angle $\theta+\Delta\theta$ obtained by adding the adjustment angle to the equally distributed reference angle, in this order along the circumferential direction of the rotor 2.

In the present embodiment, the number "N" of the stator cores 9 being the second magnetic members is a multiple of two, and the second magnetic members are fixed to both side surfaces of the second supporting member one by one.

The stator core units 113 are fixed to the casing 11 along the rotational direction, forming even angles of 45 ($=2\theta$) degrees. More specifically, if the adjustment angle "$\Delta\theta$" is two degrees, the stator core units 113 including the stator cores 9 forming the arrangement pitch angle of 24.5 ($=\theta+\Delta\theta$) degrees are used, and the stator core units 113 are fixed to the casing 11, forming the even angles of 45 ($=2\theta$) degrees along the rotational direction.

In such a manner, the core supporting blocks 112 being the second supporting members are disposed such that differences between the rotational angles, about the center of the rotor 2, of the core supporting blocks 112 that are adjacent to each other along the circumferential direction of the rotor 2 are made equal to an angle $2\theta$ being twice the abovementioned equally distributed reference angle "$\theta$" along the circumferential direction of the rotor 2.

Figure 6B:
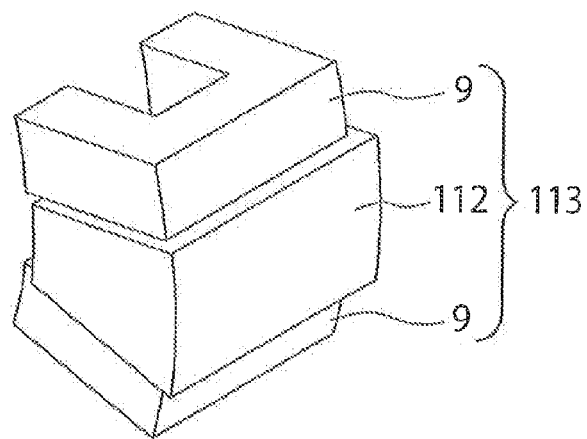
FIG. 6B is a perspective view of the stator core unit 113.
Figure 6C:
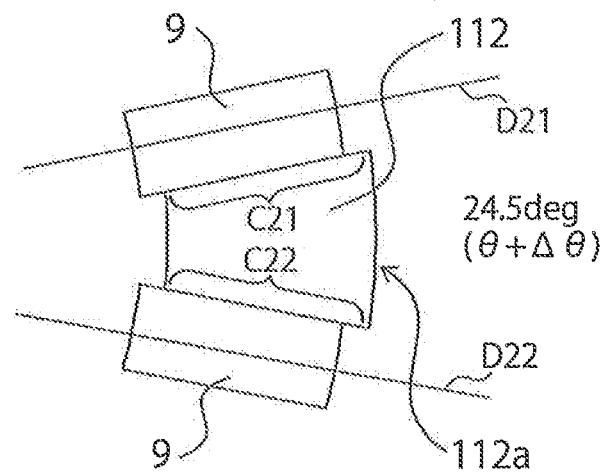
FIG. 6C is a plan view of the stator core unit 113 viewed in the z direction of the rotation axis.

FIG. 6B is a perspective view of the stator core unit 113. FIG. 6C is a plan view of the stator core unit 113 viewed in the z direction of the rotation axis.

When two planes B (reference planes) are provided, which form the arrangement pitch angle of the two stator cores 9 equal to $\theta+\Delta\theta$ and pass through the rotation axis z, the core supporting block 112 is provided such that these planes B are identical to neutral planes D21 and D22 of the stator cores 9 (planes each dividing the stator core 9 into equal parts widthwise), and the core supporting block 112 has planes (mounting planes) C21 and C22 parallel to the planes B, respectively. The stator cores 9 are brought into contact and fixed to these planes C21 and C22.

Note that, in the abovementioned embodiment, there is described that the arrangement pitch angle of the two stator cores 9 fixed to both side surfaces of the core supporting block 112 is $\theta+\Delta\theta$, as an example, but the arrangement pitch angle may be $\theta-\Delta\theta$. In this case, the stator core units including the stator cores 9 forming the arrangement pitch angle of $\theta-\Delta\theta=20.5$ deg may be used. In addition, in the above embodiment, there is described the case where the adjustment angle "$\Delta\theta$" is two degrees, but the adjustment angle "$\Delta\theta$" is not limited thereto, and may be within a range of $0 \le \Delta\theta < \theta/4$. Preferably, the adjustment angle "$\Delta\theta$" is greater than zero degree, and less than a quarter of the equally distributed reference angle "$\theta$" (i.e., $0 < \Delta\theta < \theta/4$). The cogging torque causing the uneven torque can be thereby reduced as compared with the rotary electric machine including the stator cores 9 arranged at the even angles (i.e., the adjustment angle $\Delta\theta=0$).

[Advantages of the Second Embodiment]

As described above, in the rotary electric machine 100 of the second embodiment, the number of the stator cores 9 being the second magnetic members is a multiple of two, and the stator cores 9 being the second magnetic members are fixed to both side surfaces of the core supporting block 112 being the second supporting member one by one. When the equally distributed reference angle "$\theta$" is defined as an angle obtained by dividing 360 degrees by the number N of the above second magnetic members (360/N) [deg], the core supporting blocks 112 being the second supporting member are disposed such that differences between the rotational angles, about the center of the rotor 2, of the core supporting blocks 112 that are adjacent to each other along the circumferential direction of the rotor 2, are made equal to an angle twice the equally distributed reference angle along the circumferential direction of the above rotor 2.

In such a manner, according to the 32-pole two-stage rotary electric machine 100 in the second embodiment, as with the rotary electric machine 1 in the first embodiment, the togging torque can be reduced as compared with the rotary electric machine including the stator cores 9 that are arranged forming the even angles. The rotation characteristic of suppressed uneven rotation can be thereby expected, and the occurrence of vibration and noise can be further reduced by reducing the uneven torque. In addition, since all the stator core units 113 have the same shape, manufacturing process can be simplified as compared with a manufacturing method in which the stator cores 9 are independently assembled in conformity with the nonuniform angles. As a result, manufacturing cost can be reduced, and economies of mass production can be expected at a higher level.

Third Embodiment

Figure 7A:
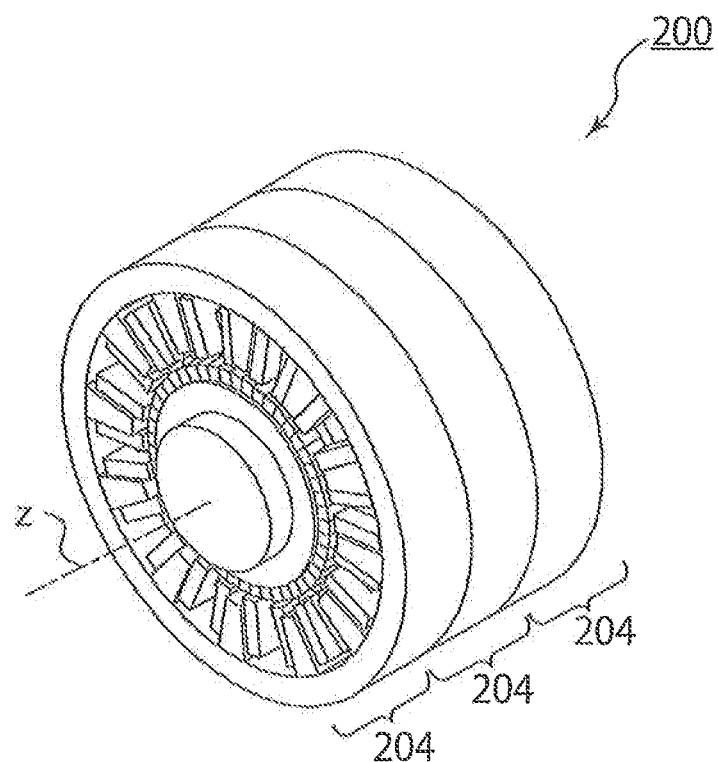
FIG. 7A is a perspective view showing a configuration of a rotary electric machine 200.
Figure 7B:
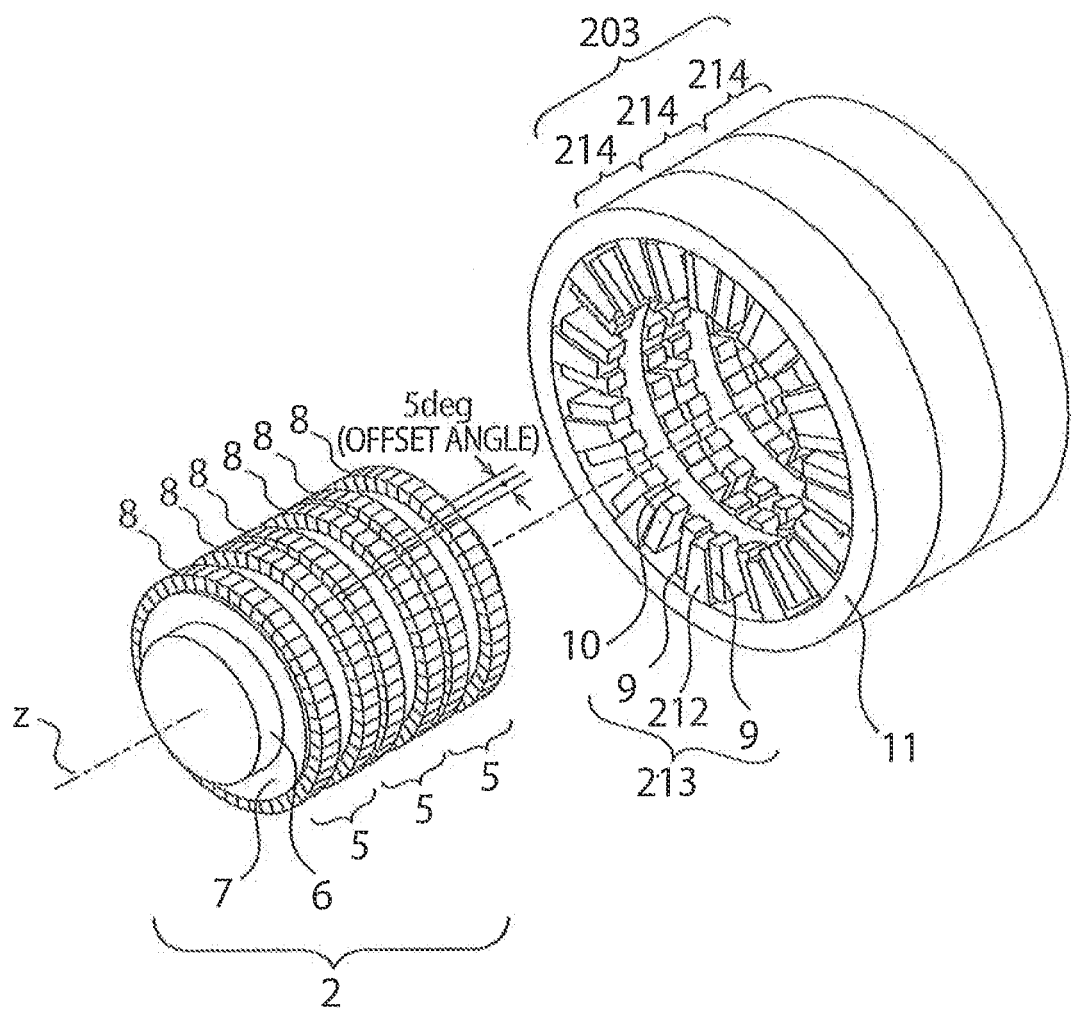
FIG. 7B is an exploded perspective view of the rotor 2 and a stator 203 that are disassembled from the rotary electric machine 200 and arranged along in the z direction of the rotation axis of the rotary electric machine 200.

A third embodiment will be next described. FIG. 7A is a perspective view showing a configuration of a rotary electric machine 200. FIG. 7B is an exploded perspective view of the rotor 2 and a stator 203 that are disassembled from the rotary electric machine 200 and arranged along in the z direction of the rotation axis of the rotary electric machine 200.

The rotary electric machine 200 is constituted by the rotor 2 that is rotatably supported by the bearing (not shown) along the rotation axis z, and a stator 203 that is provided so as to surround the entire rotor 2, and the rotary electric machine 200 is a three-stage rotary electric machine in which three basic units 204 are arranged along in the z direction of the rotation axis.

In the stator 203, armatures 214 included in the three basic units 204 along in the z direction of the rotation axis are coupled and fixed to each other with a relative angle zero (in phase in the rotational direction).

The armature 214 includes the number N=24 of the stator cores 9 that are arranged facing the permanent magnet 8 of the rotor 5 with a predetermined air gap, the circular armature coil 10 that is formed into a substantial concentric shape with the rotor 2 about the rotation axis z.

The armature 214 further includes the casing 11, and core supporting blocks 212 that are brought into contact and fixed to the inner circumferential surface of the casing 11, and form the second supporting member fixing and supporting the stator cores 9 at predetermined positions in the rotational direction.

In addition, the equally distributed reference angle $\theta=15$ (=360/N) [deg] about the rotation axis is defined, and a stator core unit 213 is configured by arranging the two stator cores 9 on a core supporting block 212 such that the arrangement pitch angle of the two stator cores 9 is equal to the equally distributed reference angle "$\theta$".

Figure 8A:
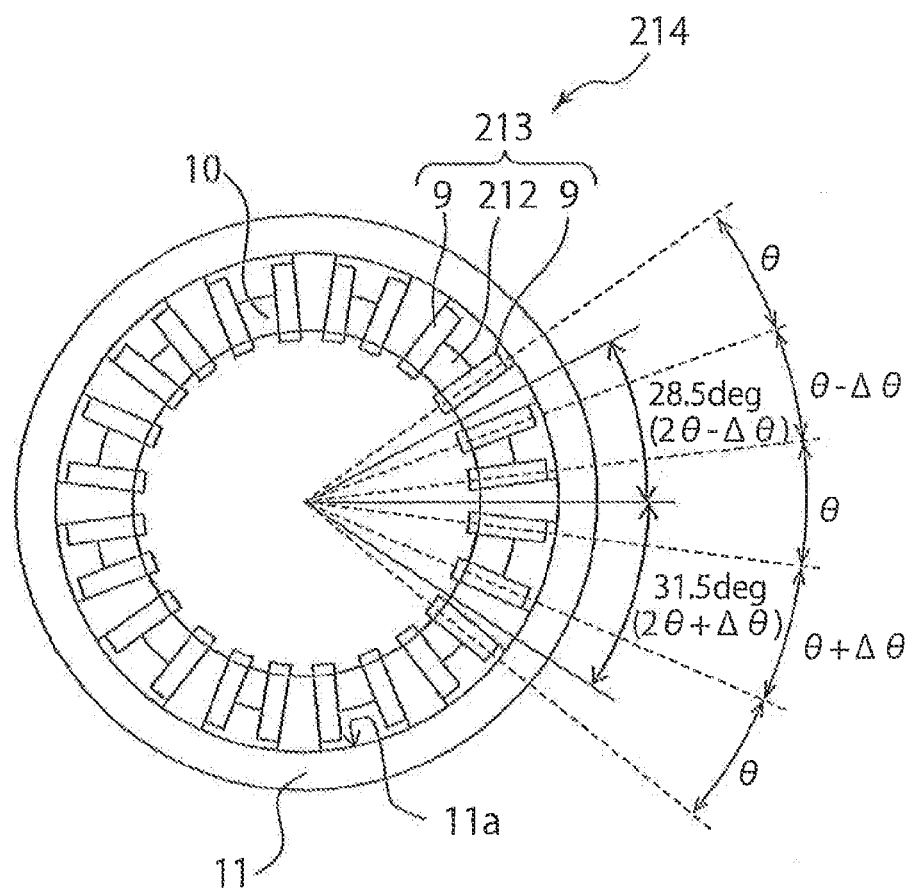
FIG. 8A is a plan view of the armature 214 viewed in rotation axis in the z direction.
Figure 8B:
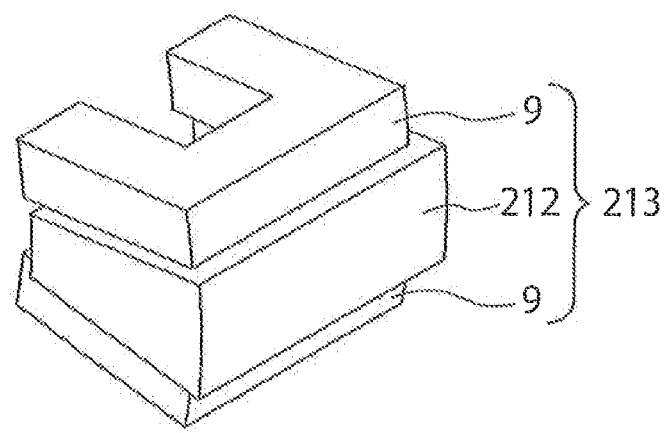
FIG. 8B is a perspective view of the stator core unit 213.
Figure 8C:
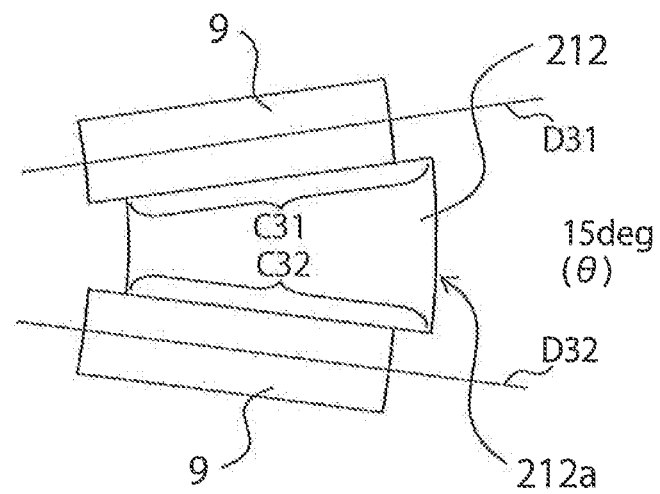
FIG. 8C is a plan view of the stator core unit 213 viewed in the z direction of the rotation axis.

FIG. 8 is a configuration diagram showing the armature 214 in the basic unit 204 further in detail. FIG. 8A is a plan view of the armature 214 viewed in rotation axis in the z direction. FIG. 8B is a perspective view of the stator core unit 213. FIG. 8C is a plan view of the stator core unit 213 viewed in the z direction of the rotation axis.

As shown in FIG. 8A, the adjustment angle "$\Delta\theta$" is defined, and the stator core units 213 are fixed to the casing 11 along the rotational direction forming nonuniform angles of $2\theta+\Delta\theta$ and $2\theta-\Delta\theta$, in this order. More specifically, for example, if the adjustment angle $\Delta\theta=1.5$ deg, $2\theta+\Delta\theta$ and $2\theta-\Delta\theta$ are 31.5 deg and 28.5 deg, respectively, and an outer circumferential surface 212a of the core supporting block 212 formed concentrically about the rotation axis z is brought into contact and fixed to the inner circumferential surface 11a of the casing 11.

From a viewpoint of the arrangement of the stator cores 9 being the second magnetic members, as shown in FIG. 8A, the stator cores 9 being the second magnetic members are arranged such that differences between the rotational angles, about the rotation axis, of the stator cores 9 being the second magnetic members that are adjacent to each other along the circumferential direction of the rotor 2 repeat an angle $\theta-\Delta\theta$ obtained by subtracting the adjustment angle "$\Delta\theta$" from the equally distributed reference angle "$\theta$", the equally distributed reference angle "$\theta$", an angle $\theta+\Delta\theta$ obtained by adding the above adjustment angle "$\Delta\theta$" to the equally distributed reference angle "$\theta$", and the equally distributed reference angle "$\theta$", in this order along the circumferential direction of the rotor 2.

As shown in FIG. 8C, when two planes B (reference planes) are provided, which form the arrangement pitch angle of the stator cores 9 that is equal to the equally distributed reference angle "$\theta$" (here, 15 degrees as an example) and pass through the rotation axis z, the core supporting block 212 is provided such that these planes B are identical to neutral plane D31 and D32 of the stator cores 9 (planes each dividing the stator cores 9 into equal parts widthwise), respectively, and the core supporting block 12 has planes (mounting planes) C31 and C32 parallel to the planes B, respectively. The stator cores 9 are brought into contact and fixed to these planes C31 and C32. Note that, in the abovementioned embodiment, there is described the case where the adjustment angle $\Delta\theta=1.5$ deg, but the adjustment angle "$\Delta\theta$" is not limited thereto, and may be within a range of $0\leq\Delta\theta<\theta/4$. Preferably, the adjustment angle "$\Delta\theta$" is greater than zero degree, and less than a quarter of the equally distributed reference angle "$\theta$" (i.e., $0<\Delta\theta<\theta/4$). The togging torque causing the uneven torque can be thereby reduced as compared with the rotary electric machine including the stator cores 9 arranged forming the even angles (i.e., the adjustment angle $\Delta\theta=0$).

Fourth Embodiment

A fourth embodiment will be next described.

Figure 9A:
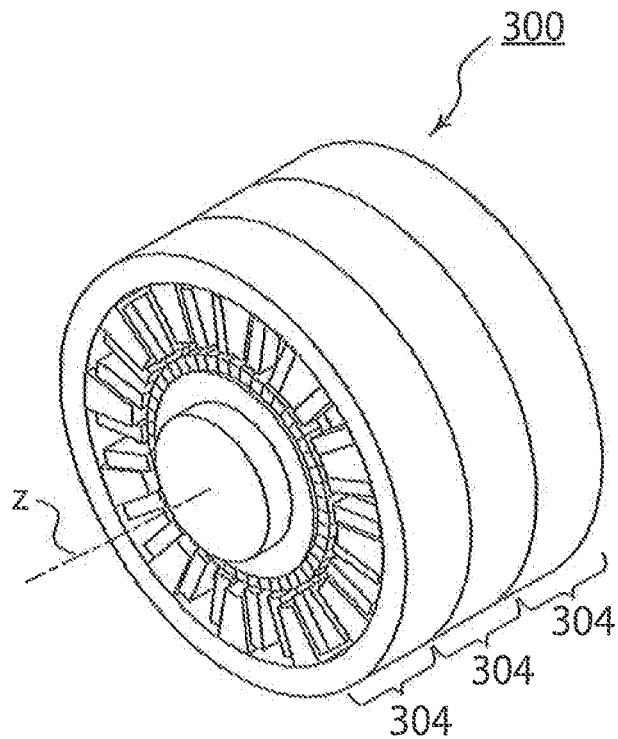
FIG. 9A is a perspective view showing a configuration of a rotary electric machine 300.
Figure 9B:
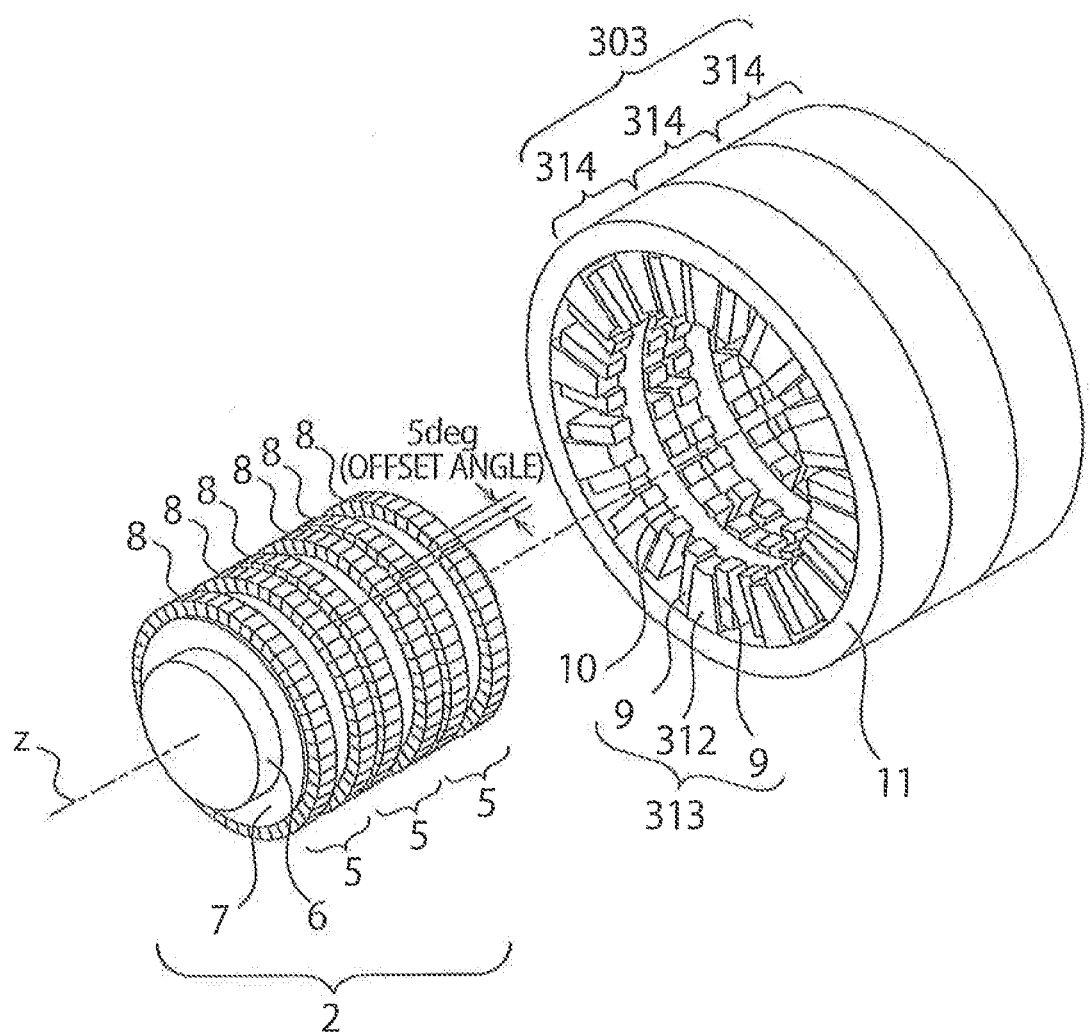
FIG. 9B is an exploded perspective view of the rotor 2 and a stator 303 that are disassembled from the rotary electric machine 300 and arranged along a rotation axis in the z direction of the rotary electric machine 300.

FIG. 9A is a perspective view showing a configuration of a rotary electric machine 300. FIG. 9B is an exploded perspective view of the rotor 2 and a stator 303 that are disassembled from the rotary electric machine 300 and arranged along a rotation axis in the z direction of the rotary electric machine 300. The rotary electric machine 300 is constituted by the rotor 2 that is rotatably supported by the bearing (not shown) along the rotation axis z, and the stator 303 that is provided so as to surround the entire rotor 2, and the rotary electric machine 300 is a three-stage rotary electric machine in which three basic units 304 are arranged along in the z direction of the rotation axis.

In the stator 303, armatures 314 in the three basic units 304 that are arranged along in the z direction of the rotation axis are coupled and fixed to one another with a relative angle of zero (in phase in the rotational direction).

The armature 314 includes the number N=24 of the stator cores 9 that are arranged facing the permanent magnet 8 of the rotor 5 with a predetermined air gap, and the circular armature coil 10 that is formed into a substantial concentric shape with the rotor 2 about the rotation axis z.

The armature 314 further includes the casing 11, and a core supporting blocks 312 that are brought into contact and fixed to the inner circumferential surface of the casing 11 and form the second supporting members fixing and supporting the stator cores 9 at predetermined positions in the rotational direction.

In addition, the equally distributed reference angle $\theta=15$ (=360/N) [deg] about the rotation axis and the adjustment angle "$\Delta\theta$" are defined, and a stator core unit 313 is configured by arranging the two stator cores 9 on the core supporting block 312 such that the arrangement pitch angle of the two stator cores 9 is equal to $\theta+\Delta\theta$.

Figure 10A:
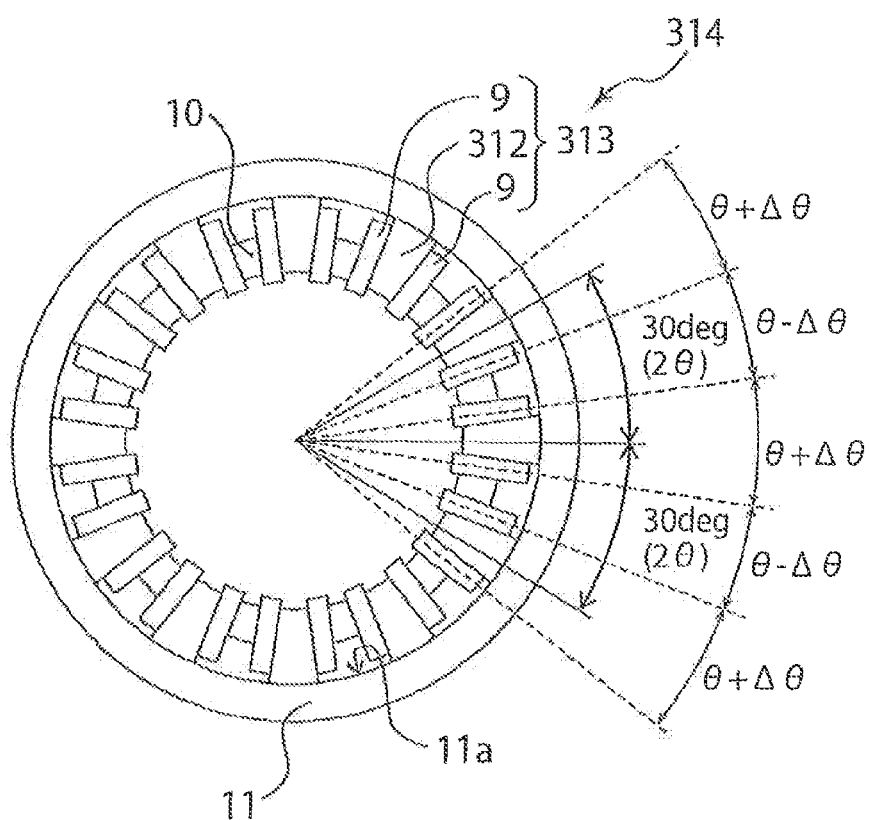
FIG. 10A is a plan view of the armature 314 viewed in the z direction of the rotation axis.
Figure 10B:
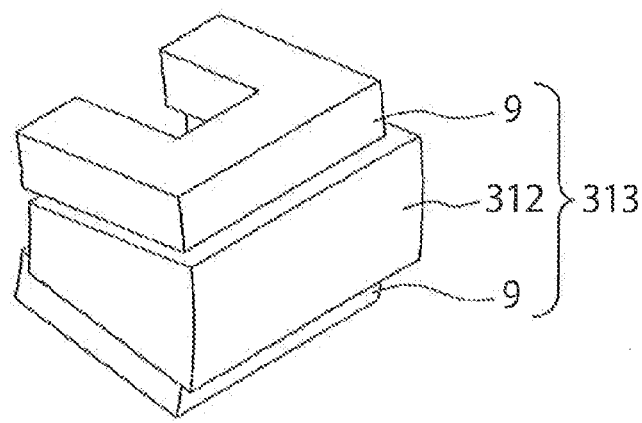
FIG. 10B is a perspective view of the stator core unit 313.
Figure 10C:
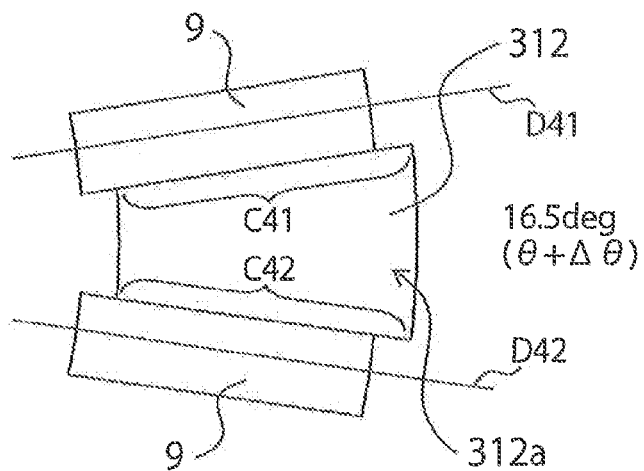
FIG. 10C is a plan view of the stator core unit 313 viewed in the z direction of the rotation axis.

FIG. 10 is a configuration diagram showing the armature 314 in the basic unit 304 further in detail. FIG. 10A is a plan view of the armature 314 viewed in the z direction of the rotation axis. FIG. 10B is a perspective view of the stator core unit 313. FIG. 10C is a plan view of the stator core unit 313 viewed in the z direction of the rotation axis.

As shown in FIG. 10A, the stator core units 313 are fixed to the casing 11 along the rotational direction at the even angles of $2\theta$. More specifically, if the adjustment angle "$\Delta\theta$" is 1.5 degrees, the stator core units 313 including the two stator cores 9 fixed to both side surfaces of core supporting block 312, forming the arrangement pitch angle of 16.5 (=$\theta+\Delta\theta$) [deg], are used, and the stator core unit 313 is fixed to the casing 11 along the rotational direction at the even angles of $30(=2\theta)$ [deg].

From a viewpoint of the arrangement of the stator cores 9 being the second magnetic members, as shown in FIG. 10A, the second magnetic members are arranged such that differences between rotational angles, about the rotation axis, of the stator cores 9 being the second magnetic members that are adjacent to each other along the circumferential direction of the rotor 2 repeat the angle θ−Δθ obtained by subtracting the adjustment angle from the equally distributed reference angle, and the angle θ+Δθ obtained by adding the adjustment angle to the equally distributed reference angle, in this order along the circumferential direction of rotor 2.

In FIG. 10C, when two planes B (reference planes) are provided, which form the arrangement pitch angle of the stator cores 9 that is equal to θ+Δθ and pass through the rotation axis z, the core supporting block 312 is provided such that these planes B are identical to neutral planes D41 and D42 of the stator cores 9 (planes each dividing the stator cores 9 into equal parts widthwise), respectively, and the core supporting block 312 has planes (mounting planes) C41 and C42 parallel to the planes B, respectively. The stator cores 9 are brought into contact and fixed to these planes C41 and C42.

Note that, in the above embodiment, there is described that the arrangement pitch angle of the two stator cores 9 fixed to both side surfaces of the core supporting block 112 is θ+Δθ, as an example, but the arrangement pitch angle may be θ−Δθ. In this case, the stator core units including the stator cores 9 forming the arrangement pitch angle θ−Δθ=13.5 deg may be used. In addition, in the above embodiment, there is described the case where Δθ=1.5 deg, but the adjustment angle "Δθ" is not limited thereto, and may be within a range of 0≤Δθ<θ/4. Preferably, the adjustment angle "Δθ" is greater than zero degree and less than a quarter of the equally distributed reference angle "θ" (i.e., 0<Δθ<θ/4). The cogging torque causing the uneven torque can be thereby reduced as compared with the rotary electric machine including the stator cores 9 arranged at the even angles (i.e., the adjustment angle Δθ=0).

[Advantages of the Third and Fourth Embodiments]

As described above, according to the 48-pole three-stage rotary electric machines 200 and 300 in the third and fourth embodiments, as with the rotary electric machines 1 and 100 in the first and second embodiments, the cogging torque can be reduced as compared with the rotary electric machine including the stator cores 9 that are arranged forming the even angles. For this reason, the rotation characteristic of suppressed uneven rotation can be expected, and the occurrence of vibration and noise can be further reduced by reducing the uneven torque. In addition, since all the stator core units 213 and 313 have the same shape, a manufacturing process can be simplified as compared with a manufacturing method in which the stator cores 9 are independently assembled in conformity with the nonuniform angles. As a result, manufacturing cost can be reduced, and economies of mass production can be expected at a high level.

Figure 11:
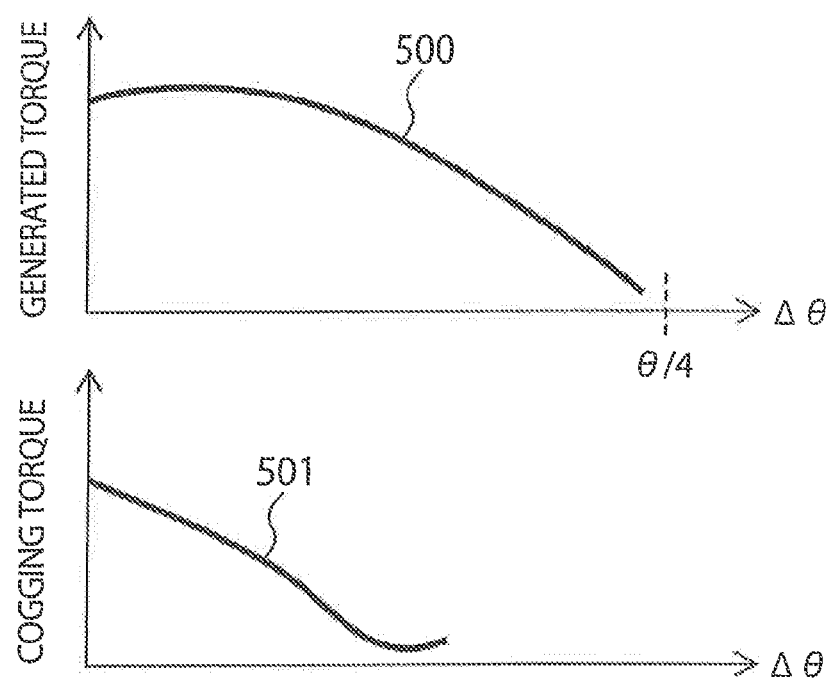
FIG. 11 is an example of a graph showing a relationship between the adjustment angle "Δθ", and a generated torque and a cogging torque.

FIG. 11 is an example of a graph showing a relationship between the adjustment angle "Δθ", and a generated torque and a cogging torque. A generated torque curve 500 falls as the adjustment angle "Δθ" increases, and a cogging torque curve 501 also falls at the same time. For this reason, a specific angle of the adjustment angle "Δθ" is a design requirement that is determined depending on required values of a generated torque and a cogging torque required for different uses. If the adjustment angle "Δθ" can be set such that a proportion of the cogging torque to the generated torque is made smallest, this is the most desirable configuration as a torque design. Note that since an available generated torque cannot be practically obtained when the adjustment angle "Δθ" becomes Δθ/4, and the adjustment angle "Δθ" may be therefore within a range of 0≤Δθ<θ/4. Preferably, the adjustment angle "Δθ" is greater than zero degree, and less than a quarter of the equally distributed reference angle "θ" (i.e., 0<Δθ<θ/4). The cogging torque causing the uneven torque can be thereby reduced as compared with the rotary electric machine including the stator cores 9 arranged at the even angles (i.e., the adjustment angle Δθ=0).

[Modifications of the Embodiments]

In the embodiments, the arrangements of the first magnetic members and the second magnetic members are merely examples, and the present invention is not limited thereto.

As a modification 1, in at least one of the plurality of pairs of the first magnetic member and the second magnetic members facing each other, the second magnetic member may be shifted with respect to the first magnetic member in the circumferential direction of the rotor 2. The rotational angles of the rotor 2 at which the torque reaches a peak are thereby made different in all pairs of the first magnetic members and the second magnetic members, which can reduce the cogging torque causing the uneven torque.

In a modification 2, in addition to this modification 1, furthermore, in an even number of the plurality of pairs of the first magnetic member and the second magnetic members facing each other, the second magnetic member may be shifted with respect to the first magnetic member in the circumferential direction of the rotor, and the number of the second magnetic members that are shifted with respect to the first magnetic member in the first circumferential direction of the rotor may be equal to the number of the second magnetic members that are shifted with respect to the first magnetic members in the second circumferential direction opposite to the first circumferential direction of the rotor. The deviation in direction of the force applied to the second magnetic members in one revolution of the rotor can be thereby reduced.

In a modification 3, in addition to this modification 2, furthermore, an adjustment angle by which the second magnetic members are shifted in the above first circumferential direction with respect to the first magnetic member may be substantially equal to an adjustment angle of shifting in the above second circumferential direction. Here, "being substantially equal" means that both of the adjustment angles are equal to each other, or a difference therebetween is within a predetermined range. The total of the force in the first circumferential direction (e.g., clockwise) applied to the second magnetic members during one revolution of the rotor can be thereby made equal or substantially equal to the total of the force applied in the second circumferential direction (e.g., counterclockwise). The deviation in the direction of the force applied to the second magnetic members during one revolution of the rotor can be thereby further reduced as compared with the modification 2.

In a modification 4, in at least two of the plurality of pairs of the first magnetic member and the second magnetic members that face each other, the total of the adjustment angles by which the second magnetic members are shifted with respect to the first magnetic member in the first circumferential direction of the rotor during one revolution of the rotor 2 in the circumferential direction may be equal to the total of the adjustment angles by which the second magnetic members are shifted with respect to the first magnetic member in the second circumferential direction that is opposite to the first circumferential direction of the rotor. The deviation in the direction of the force applied to second magnetic members during one revolution of the rotor can be thereby reduced.

As described above, according to the embodiments, since the supporting members each of which can support and fix the vicinity of the magnetic pole portions of the stator core with high stiffness are included, support stiffness for the stator core can be enhanced and there is expectations for preventing the vibration and noise from generating even in the case of generation of the magnetic force that intermittently changes with respect to the magnetic pole portions of the stator core in the rotational direction with rotational driving. In addition, the cogging torque can be reduced by determining the arrangement pitch angle of the stator cores formed by the supporting members and the positions of fixing to the casing by a predetermined method, and it can be thereby expected that the rotation characteristic of the suppressed uneven rotation is achieved.

In such a manner, by providing the rotary electric machine with which enhancement of the rotation characteristic is achieved by supporting the stator cores with high stiffness and reducing the uneven rotation, a rotary electric machine can be manufactured, which is downsized over the entire machine while the rotation performances such as higher power and higher torque are enhanced. For this reason, it can be expected that the rotary electric machines are used as high-torque-high-power driving sources (e.g., electric motors) included in machines covering the fields of machine tools, vessels, automobiles, and robots, and a wide variety of other fields where an extremely high torque or output density is required, and are used as large-sized electric generators.

[First Usage Example of the Rotary Electric Machine]

The rotary electric machines 1, 100, 200, and 300 in the embodiments can be used as an electric motor that converts electrical energy into mechanical energy, and the usage example will be described below.

Figure 12A:
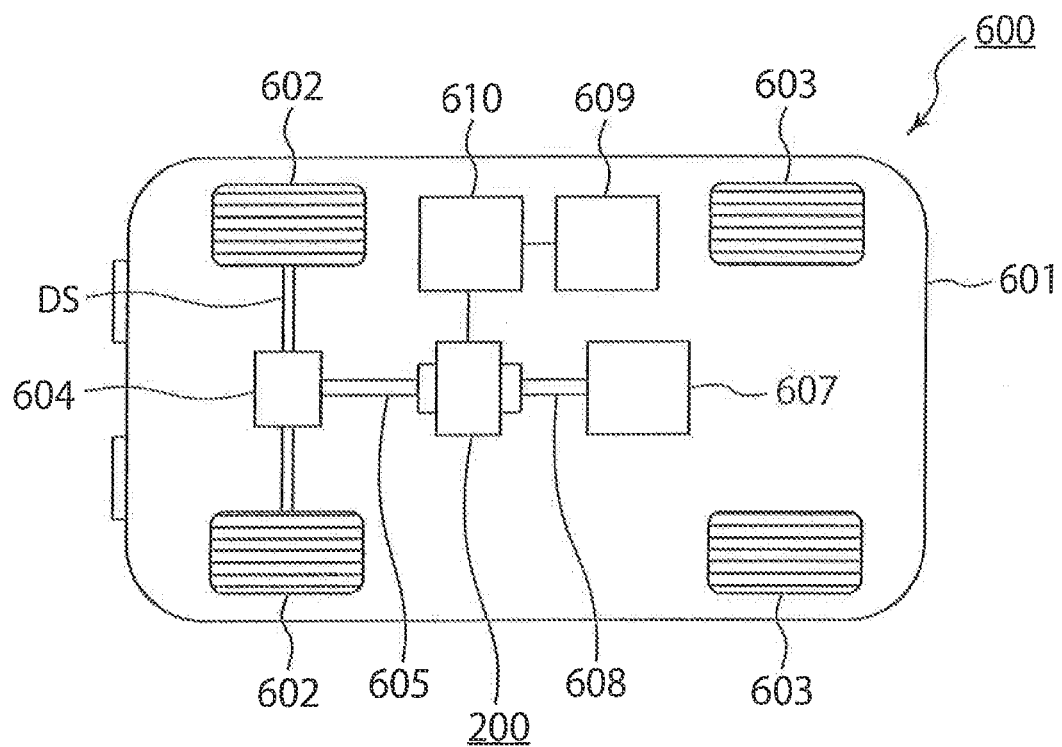
FIG. 12A is a configuration diagram showing a drive-train element of the electric vehicle 600 using the rotary electric machine 200 in the third embodiment.
Figure 12B:
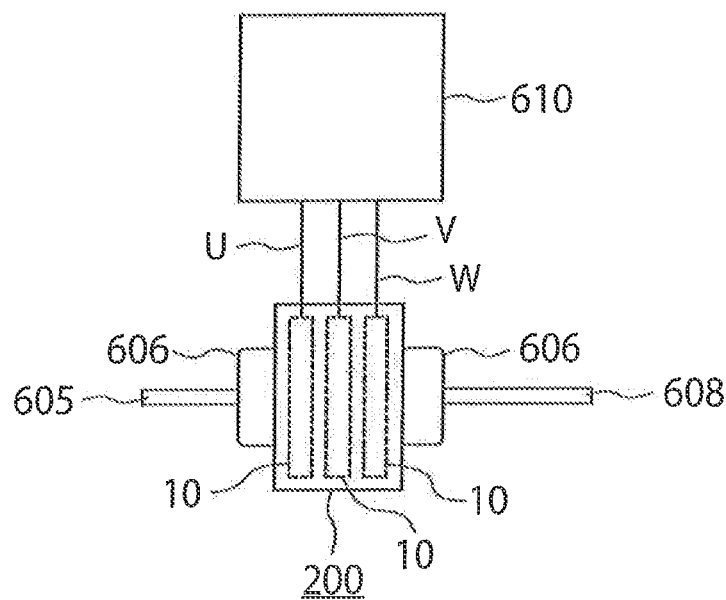
FIG. 12B is a partial enlarged view centered about the rotary electric machine 200.

FIG. 12 shows an electric vehicle 600 using the rotary electric machine 200, as a first usage example of the rotary electric machine 200 in the third embodiment. FIG. 12A is a configuration diagram showing a drive-train element of the electric vehicle 600 using the rotary electric machine 200 in the third embodiment, FIG. 12B is a partial enlarged view centered about the rotary electric machine 200.

The electric vehicle 600 configures a so-called hybrid electric vehicle (HEV), and supports a car body 601 with two front wheels 602 and two rear wheels 603. The front wheels 602 are then coupled to the rotor 2 of the rotary electric machine 200 via a driving shaft DS, a differential gear 604, and a driving shaft 605.

The rotor 2 is rotatably supported by bearings 606 arranged on both sides of the rotary electric machine 200. An engine 607 is further included, and the engine 607 is coupled to the rotor 2 via a coupling shaft 608. Both torque from the engine 607 and torque from the rotary electric machine 200 are thereby transmitted to the front wheels 602 to serve as a driving force that drives the car body 601.

In addition, the armature coils 10 of the rotary electric machine 200 are connected to power lines of outputs U, V, and W of a controlling device 610 that operates by a power supply (battery) 609 as a power supply, and are configured such that three-phase current having phase differences of 120 degree from one another are applied thereto. Furthermore, when regenerative energy generated while the car body 601 transitions from a traveling state to a stopped state is recovered, the controlling device 610 controls such that the rotary electric machine 200 operates as an electric generator.

As described above, the electric vehicle 600 is a vehicle which includes the rotary electric machine 200 and the power supply 609 supplying electrical energy to the rotary electric machine 200, and in which the rotary electric machine 200 converts the electrical energy supplied by the power supply 609 into mechanical energy. Thus, according to the electric vehicle 600 using the rotary electric machine 200, since the supporting members are included therein, each of which can support and fix the vicinity of the magnetic pole portions of the stator core with high stiffness, vibration and noise occurring when the rotary electric machine operates as the electric motor or the electric generator can be reduced, enhancing the energy conversion efficiency. In addition, it is possible to achieve improvement of fuel mileage by reducing fuel consumption of the engine by the rotary electric machine of the present invention that can be downsized and can generate a higher power. Note that, in the abovementioned example, there is described the electric vehicle 600 using the rotary electric machine 200, but the electric vehicle 600 may have a configuration using any of the rotary electric machines 1, 100, and 300. In addition, the electric vehicle 600 has the configuration of the hybrid electric vehicle (HEV), but may have a configuration of an electric vehicle (EV), and in this case, electric mileage of the electric vehicle can be expected to improve.

Note that, in the first usage example, there is described the example in which the vehicle includes the rotary electric machine 200, but the rotary electric machine 200 may be included in machines covering the fields of machine tools, vessels, and robots, and a wide variety of other fields.

[Second Usage Example of the Rotary Electric Machine]

The rotary electric machines 1, 100, 200, and 300 in the embodiments can be used as an electric generator that converts mechanical energy into electrical energy, and another usage example of the rotary electric machine 200 of the third embodiment will be described below.

Figure 13:
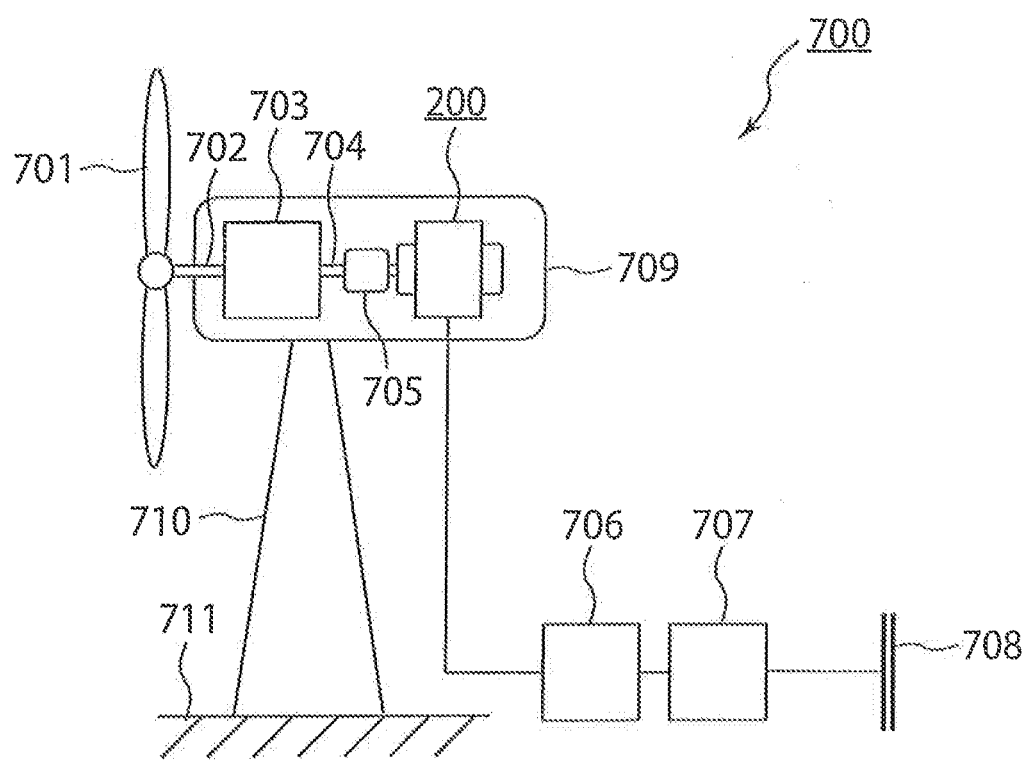
FIG. 13 is a diagram showing a wind-power generating machine 700 using the rotary electric machine 200 of the third embodiment.

FIG. 13 is a diagram showing a wind-power generating machine 700 using the rotary electric machine 200 of the third embodiment. Blades (windmill) 701 are caused to rotate by wind power, and torque is transmitted to a gear box 703 via a rotating shaft 702. In addition, output torque from the gear box 703 is transmitted to the rotor 2 (not shown) via a rotating shaft 704 and a shaft coupling 705, and causes the rotary electric machine 200 to generate power. The generated power is supplied to an electric power system 708 via a transformer 706 and a system protecting device 707.

Furthermore, principal parts of a rotating system including the gear box 703 and the rotary electric machine 200 are housed in a machine room called a nacelle 709 and supported by a tower 710 to be set at a height at which the wind power can be efficiently obtained, and this tower 710 is fixed to a foundation 711 provided on land or on a floating body on the sea.

As described above, the wind-power generating machine 700 is an electric generating machine which includes the blades 701 and the rotary electric machine 200, and in which the rotary electric machine 200 converts the mechanical energy obtained through the conversion into the electrical energy performed by the blade 701.

Thus, according to the wind-power generating machine 700 using the rotary electric machine 200, since the supporting members are included therein each of which can support and fix the vicinity of the magnetic pole portions of the stator core with high stiffness, vibration and noise occurring when the rotary electric machine operates can be reduced. For this reason, energy can be efficiently converted as energy for generating electricity, which disappears as vibration and noise otherwise.

In addition, since the rotary electric machine of the present invention that can be downsized and can generate a higher power can achieve reduction in size and weight of the nacelle 709 and can relax design conditions for machine strength required to the tower 710, reduction in construction cost and construction period of the tower can be expected and the costs of the entire wind-power generating machine 700 can be reduced.

In the case of the floating wind turbine generator in which the foundation 711 is a floating body on the sea, reductions in the marine transportation cost of the nacelle 709 and the construction cost of the floating body of the foundation 711 can be expected as well as the reduction in the construction period thereof, and the cost of the entire wind-power generating machine 700 can be further reduced.

Note that, in the above example, there is described the wind-power generating machine 700 using the rotary electric machine 200, but the wind-power generating machine 700 may have a configuration using any of the rotary electric machines 1, 100, and 300. In addition, the rotary electric machine may be used for not only the wind-power generating machine, but also all types of electric generating machine including a water-power generating machine, for example. In this case, the electric generating machine may include fluid machinery that converts fluid energy into mechanical energy, and may include the rotary electric machine that converts the mechanical energy through the conversion performed by the fluid machinery into electrical energy.

This fluid machinery includes, for example, pneumatic machinery such as blades (windmill), hydraulic machinery such as a water wheel, and steam machinery such as a turbine. With this fluid machinery, power generation loss due to vibration and noise can be suppressed, achieving enhancement of power generation efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A rotary electric machine comprising:
    a rotor that includes a plurality of first magnetic members arranged along an outer circumferential surface, the first magnetic members each including a first magnetic pole and a second magnetic pole that is different from the first magnetic pole and is positioned away from the first magnetic pole in a rotation axis direction on the outer circumferential surface;
    a first supporting member that surrounds a periphery of the rotor;
    a plurality of second supporting members that are fixed to an inner circumferential surface of the first supporting member; and
    a plurality of second magnetic members that are fixed on side surfaces of the second supporting members and that have a third magnetic pole facing the first magnetic pole with an air gap and a fourth magnetic pole being a magnetic pole different from the third magnetic pole and facing the second magnetic pole with an air gap at a position away from the third magnetic pole in the rotation axis direction of the rotor,
    wherein each of the plurality of second magnetic members is disposed at nonuniform angles along an inner circumferential surface of the first supporting members.

2. The rotary electric machine according to claim 1, wherein in at least one of a plurality of pairs of the first magnetic members and the second magnetic members facing each other, the second magnetic members are shifted with respect to the first magnetic members in a circumferential direction of the rotor.

3. The rotary electric machine according to claim 1, further comprising a coil that surrounds the rotor in the circumferential direction, wherein
    current flowing through the coil generates a magnetic circuit therein, and thereby the second magnetic members generate the third magnetic pole and the fourth magnetic pole.

4. An electric motor comprising the rotary electric machine according to claim 1, wherein the rotary electric machine converts electrical energy into mechanical energy.

5. A machine comprising the rotary electric machine according to claim 1, wherein the rotary electric machine converts electrical energy into mechanical energy.

6. An electric generator comprising the rotary electric machine according to claim 1, wherein the rotary electric machine converts mechanical energy into electrical energy.

7. An electric generating machine comprising:
    a fluid machine that converts fluid energy into mechanical energy; and
    the rotary electric machine according to claim 1, wherein the rotary electric machine converts mechanical energy obtained through the conversion performed by the fluid machine into electrical energy.

8. The rotary electric machine according to claim 1, further comprising a coil,
    wherein the third and fourth magnetic poles are magnetized by an electric current passing through the coil.

9. A rotary electric machine comprising:
    a rotor that is rotatable at a predetermined position and includes a plurality of first magnetic members arranged along an outer circumferential surface, the first magnetic members each including a first magnetic pole and a second magnetic pole that is different from the first magnetic pole and is positioned away from the first magnetic pole in a rotation axis direction on the outer circumferential surface; and
    a stator that includes a plurality of second magnetic members each having a third magnetic pole facing the first magnetic pole with an air gap, and a fourth magnetic pole that is a magnetic pole different from the third magnetic pole and faces the second magnetic pole with an air gap at a position away from the third magnetic pole in the rotation axis direction of the rotor, wherein
    in at least one of a plurality of pairs of the first magnetic members and the second magnetic members facing each other, the second magnetic members are shifted with respect to the first magnetic members in the circumferential direction of the rotor,
    wherein each of the plurality of second magnetic members is disposed at nonuniform angles along an inner circumferential surface of the stator.

10. The rotary electric machine according to claim 9, further comprising a coil,
    wherein the third and fourth magnetic poles are magnetized by an electric current passing through the coil.

11. A rotary electric machine comprising:
    a rotor that includes a plurality of first magnetic members arranged along an outer circumferential surface, the first magnetic members each including a first magnetic pole and a second magnetic pole that is different from the first magnetic pole and is positioned away from the first magnetic pole in a rotation axis direction on the outer circumferential surface;

a first supporting member that surrounds-a periphery of the rotor;

a plurality of second supporting members that are fixed to an inner circumferential surface of the first supporting member; and a plurality of second magnetic members that are fixed on side surfaces of the second supporting members and that have a third magnetic pole facing the first magnetic pole with an air gap and a fourth magnetic pole being a magnetic pole different from the third magnetic pole and facing the second magnetic pole with an air gap at a position away from the third magnetic pole in the rotation axis direction of the rotor, wherein the second magnetic members are disposed with gaps along an inner circumferential surface of the stator, and a size of at least one gap among the gaps along the inner circumferential surface of the stator is different from a size of the other gaps.

12. The rotary electric machine according to claim 11, further comprising a coil, wherein the third and fourth magnetic poles are magnetized by an electric current passing through the coil.

* * * * *